United States Patent
Gupta et al.

(10) Patent No.: US 7,383,231 B2
(45) Date of Patent: Jun. 3, 2008

(54) PERFORMING AUTOMATICALLY AUTHORIZED PROGRAMMATIC TRANSACTIONS

(75) Inventors: Vikas Gupta, Bangalore (IN); Allan H. Vermeulen, Seattle, WA (US); Eugene Wei, New York, NY (US); Andrew R. Jassy, Seattle, WA (US); Jeffrey P. Bezos, Greater Seattle, WA (US); Duane J. Krause, Seattle, WA (US); David A. Schappell, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 257 days.

(21) Appl. No.: 10/894,350

(22) Filed: Jul. 19, 2004

(65) Prior Publication Data

US 2006/0015463 A1 Jan. 19, 2006

(51) Int. Cl.
*G06Q 99/00* (2006.01)
(52) U.S. Cl. .............................. 705/66; 705/67; 705/64
(58) Field of Classification Search .................. 705/66, 705/67, 64
See application file for complete search history.

(56) References Cited

U.S. PATENT DOCUMENTS

| | | | |
|---|---|---|---|
| 4,658,093 A | 4/1987 | Hellman | 380/25 |
| 5,649,099 A | 7/1997 | Theimer et al. | 713/201 |
| 6,044,469 A | 3/2000 | Horstmann | 713/201 |
| 6,157,920 A | 12/2000 | Jakobsson et al. | 705/69 |
| 6,748,367 B1 | 6/2004 | Lee | 705/66 |
| 7,113,930 B2 * | 9/2006 | Eccles et al. | 705/65 |
| 2002/0044662 A1 | 4/2002 | Sowler | 380/277 |
| 2002/0111886 A1* | 8/2002 | Chenevich et al. | 705/30 |

(Continued)

FOREIGN PATENT DOCUMENTS

EP 1 239 391 9/2002

(Continued)

OTHER PUBLICATIONS

Long, J., et al., "Securing A New Era Of Financial Services," *IT Pro*, Jul./Aug. 2003, pp. 49-55, retrieved Feb. 28, 2006, from http://crec.mccombs.utexas.edu/works/articles/published_version.pdf, 7 pages.

(Continued)

*Primary Examiner*—Pierre Eddy Elisca
(74) *Attorney, Agent, or Firm*—Seed IP Law Group

(57) ABSTRACT

Techniques are described for facilitating interactions between computing systems, such as by performing transactions between parties that are automatically authorized via a third-party transaction authorization system. In some situations, the transactions are programmatic transactions involving the use of fee-based Web services by executing application programs, with the transaction authorization system authorizing and/or providing payments in accordance with private authorization instructions previously specified by the parties. The authorization instructions may include predefined instruction rule sets that regulate conditions under which a potential transaction can be authorized, with the instruction rule sets each referenced by an associated reference token. After one or more of the parties to a potential transaction supply reference tokens for the parties, the transaction authorization system can determine whether to authorize the transaction based on whether the instruction rule sets associated with the reference tokens are compatible or otherwise satisfied.

65 Claims, 18 Drawing Sheets

U.S. PATENT DOCUMENTS

| | | | |
|---|---|---|---|
| 2002/0152158 A1 | 10/2002 | Paleiov et al. | 705/309 |
| 2003/0126077 A1 | 7/2003 | Kantor et al. | 705/40 |
| 2003/0126229 A1 | 7/2003 | Kantor et al. | 709/217 |
| 2003/0140010 A1 | 7/2003 | Patterson et al. | 705/76 |

FOREIGN PATENT DOCUMENTS

| | | |
|---|---|---|
| JP | 2006260538 A * | 9/2006 |
| WO | WO 01/43033 A1 | 6/2001 |
| WO | WO 02/37233 A2 | 5/2002 |

OTHER PUBLICATIONS

Pay Pal, "Common Questions About Verification," accessed Mar. 12, 2005, URL= https://www.paypal.com/us/cgi-bin/webscr?cmd=p/pop/vertification_about, 2 pages.

Pay Pal, "PayPal Web Services & Developer Central," accessed Sep. 21, 2004, URL=http://www.paypal.com/cgi-bin/webscr?cmd=p/pdn/devcentral_landing-outside, 1 page.

Vertical Web Media, "More Web Retailers Will Check Out E—checks," Sep. 9, 2004, accessed Sep. 21, 2004, URL= http://www.internetretailer.com/printArticle.asp?id=12844, 5 pages.

Sales Masters World, "Top 5 Reasons Your Business Needs ACH Processing," accessed Sep. 21, 2004, URL= http://www.sales-masters-world.com/printpage.php/ACH-processing/, 2 pages.

Nacha, "What is ACH?" accessed Mar. 16, 2005, URL= http://www.nacha.org/About/what_is_ach_.htm, 2 pages.

Lomuscio, A., et al., "A Classification Scheme for Negotiation in Electronic Commerce," 2001, accessed Sep. 21, 2004 from ecs.soton.ac.uk/~nrj/download . . . gdn02.ps, 31 pages.

Tsvetovatyy, M., et al., "MAGMA: An Agent-Based Virtual Market for Electronic Commerce," *Journal of Applied Artificial Intelligence*, pp. 1-29, 1997.

Yahoo! Inc., "Welcome to Yahoo! Bill Pay," accessed Aug. 4, 2005, URL= http://finance.yahoo.com/bp, 1 page.

Yahoo! Inc., "Bill Pay Tour—Welcome!" accessed Aug. 4, 2005, URL= http://help.yahoo.com/help/fin/bills/tour/tour-01.html, 1 page.

Yahoo! Inc., "Bill Pay Tour—Home," accessed Aug. 4, 2005, URL= http://help.yahoo.com/help/us/fin/bills/tour/tour-02.html, 2 pages.

Yahoo! Inc., "Bill Pay Tour—Make Payment," accessed Aug. 4, 2005, URL= http://help.yahoo.com/help/us/fin/bills/tour/tour-03.html, 1 page.

Yahoo! Inc., "Bill Pay Tour—Payment History," accessed Aug. 4, 2005, URL= http://help.yahoo.com/help/us/fin/bills/tour/tour-04.html, 1 page.

Yahoo! Inc., "Bill Pay Tour—Payee List," accessed Aug. 4, 2005, URL= http://help.yahoo.com/help/us/fin/bills/tour/tour-05.html, 1 page.

Yahoo! Inc., "Bill Pay Tour—Customer Care," accessed Aug. 4, 2005, URL= http://help.yahoo.com/help/us/fin/bills/tour/tour-06.html, 1 page.

Yahoo! Inc., "Bill Pay Tour—A Sample Electronic Bill," accessed Aug. 4, 2005, URL= http://help.yahoo.com/help/us/fin/bills/tour/tour-07.html, 2 pages.

Yahoo! Inc., "Bill Pay Tour—End of Tour," accessed Aug. 4, 2005, URL= http://help.yahoo.com/help/us/fin/bills/tour/tour-08.html, 1 page.

Yahoo! Inc., "Yahoo! Finance—Account Information Help," accessed Aug. 4, 2005, URL= http://help.yahoo.com/help/us/fin/bills/acct, 4 pages.

Yahoo! Inc., "What is Yahoo Bill Pay?" accessed Aug. 4, 2005, URL= http://help.yahoo.com/help/us/fin/bills/bills-01.html, 1 page.

Yahoo! Inc., "How Does Yahoo! Bill Pay Work?" accessed Aug. 4, 2005, URL= http://help.yahoo.com/help/us/fin/bills/bills-02.html, 2 pages.

Yahoo! Inc., "Upcoming Payments Help," accessed Aug. 4, 2005, URL= http://help.yahoo.com/help/us/fin/bills/upcoming/, 8 pages.

Yahoo! Inc., "Making Payments Help," accessed Aug. 4, 2005, URL= http://help.yahoo.com/help/us/fin/bills/make/, 6 pages.

Yahoo! Inc., "Payment History Help," accessed Aug. 4, 2005, URL= http://help.yahoo.com/help/us/fin/bills/history/, 4 pages.

Yahoo! Inc., "Payee List Help," accessed Aug. 4, 2005, URL= http://help.yahoo.com/help/us/fin/bills/payees/, 9 pages.

Yahoo! Inc., "What is a Yahoo! Security Key?" accessed Aug. 4, 2005, URL= http://help.yahoo.com/help/skey/skey-01.html, 1 page.

Yahoo! Inc., "How Does the Security Key Work Technically?" accessed Aug. 4, 2005, URL= http://help.yahoo.com/help/skey/skey-10.html, 2 pages.

Yan, G., et al., "Toolkits for a Distributed, Agent-Based Web Commerce System—Introduction," Dec. 6, 1998, accessed Aug. 4, 2005, URL= http://www.webdevelopersjournal.com/articles/ecommerce/yan01.html, 3 pages.

Yan, G., et al., "Toolkits for a Distributed, Agent-Based Web Commerce System—Agent-Based Web Commerce System," Dec. 6, 1998, accessed Aug. 4, 2005, URL= http://www.webdevelopersjournal.com/articles/ecommerce/yan02.html, 3 pages.

Yan, G., et al., "Toolkits for a Distributed, Agent-Based Web Commerce System—Seller Software Toolkit," Dec. 6, 1998, accessed Aug. 4, 2005, URL= http://www.webdevelopersjournal.com/articles/ecommerce/yan03.html, 4 pages.

Yan, G., et al., "Toolkits for a Distributed, Agent-Based Web Commerce System—Buyer Software Toolkit," Dec. 6, 1998, accessed Aug. 4, 2005, URL= http://www.webdevelopersjournal.com/articles/ecommerce/yan04.html, 4 pages.

Yan, G., et al., "Toolkits for a Distributed, Agent-Based Web Commerce System—Directory Agent," Dec. 6, 1998, accessed Aug. 4, 2005, URL= http://www.webdevelopersjournal.com/articles/ecommerce/yan05.html, 3 pages.

Yan, G., et al., "Toolkits for a Distributed, Agent-Based Web Commerce System—Agent Interactions," Dec. 6, 1998, accessed Aug. 4, 2005, URL= http://www.webdevelopersjournal.com/articles/ecommerce/yan06.html, 3 pages.

Yan, G., et al., "Toolkits for a Distributed, Agent-Based Web Commerce System—Related Work," Dec. 6, 1998, accessed Aug. 4, 2005, URL= http://www.webdevelopersjournal.com/articles/ecommerce/yan07.html, 3 pages.

Yan, G., et al., "Toolkits for a Distributed, Agent-Based Web Commerce System—Summary & References," Dec. 6, 1998, accessed Aug. 4, 2005, URL= http://www.webdevelopersjournal.com/articles/ecommerce/yan08.html, 3 pages.

U.S. Appl. No. 10/894,347, filed Jul. 19, 2004, Gupta.

"Paying for Music in the Internet Age," Sep. 17, 2004, retrieved Oct. 7, 2004, from http://www.npr.org/templates/story/story.php?storyId=3918234, 1 page.

BitPass, Inc., "About Us," Copyright 2004, retrieved Oct. 7, 2004, from http://www.bitpass.com/learn/AboutUs/, 1 page.

BitPass, Inc., "The Easy Way to Buy Online Content and Services," Copyright 2004, retrieved Oct. 7, 2004, from https://www.bitpass.com/spend/, 1 page.

BitPass, Inc., "Spender FAQs," Copyright 2004, retrieved Oct. 7, 2004, from https://www.bitpass.com/spend/FAQ/, 4 pages.

BitPass, Inc., "The Easy Way to Sell Online Content and Services," Copyright 2004, retrieved Oct. 7, 2004, from https://www.bitpass.com/earn/, 1 page.

BitPass, Inc., "Earner FAQs," Copyright 2004, retrieved Oct. 7, 2004, from https://www.bitpass.com/earn/FAQ/, 3 pages.

Peppercoin, Inc., "What does Peppercoin do?," Copyright 2004, retrieved Oct. 7, 2004, from http://corp.peppercoin.com/company/about.shtml, 2 pages.

Peppercoin, Inc., "Increase Profits and Delight Customers with a New Class of Low-Priced Offers," Copyright 2004, retrieved Oct. 7, 2004, from http://corp.peppercoin.com/solution/overview.shtml, 2 pages.

Peppercoin, Inc., "Intelligent Aggregation™ is the Foundation," Copyright 2004, retrieved Oct. 7, 2004, from http://corp.peppercoin.com/solution/technology.shtml, 2 pages.

iEntry, Inc.®, "New PayPal Checkout Process Makes Online Shopping Easier," Feb. 20, 2004, retrieved Aug. 9, 2004, from http://www.webpronews.com/printable.php, 2 pages.

Associated Press, "Paypal to Offer Credit Lines on eBay," Jun. 25, 2004, retrieved Aug. 9, 2004, from http://www.shareholder.com/paypal/news/20040625-USarticle.htm, 1 page.

Paypal, "Paypal Announces 'PayPal Web Services'," May 3, 2004, retrieved Aug. 9, 2004, from http://www.shareholder.com/paypal/releaseDetail.cfm?ReleaseID=134353&Catagory=US, 2 pages.

ContentGuard®, "ContentGuard Intellectual Property Licensing," retrieved Jun. 14, 2004, from http://www.contentguard.com/patents.asp, 1 page.

"Digital Property Rights Language (DPRL)," Jun. 20, 2001, retrieved Jun. 14, 2004, from http://xml.coverpages.org/dprl.html, 5 pages.

ContentGuard® Home Page, retrieved Jun. 14, 2004, from http://www.contentguard.com/, 1 page.

ContentGuard®, "ContentGuard MPEG REL," retrieved Jun. 14, 2004, from http://www.contentguard.com/MPEGREL_home.asp, 2 pages.

InterTrust Technologies Corp., "About Digital Rights Management," retrieved Jun. 14, 2004, from http://www.intertrust.com/main/overview/drm.html, 2 pages.

PayPal, "PayPal Shopping Cart," retrieved Jul. 15, 2004, from http://www.paypal.com/cgi-bin/webscr?cmd=p/xcl/rec/sc-intro-outside, 1 page.

PayPal, "Technical Overview," retrieved Jul. 16, 2004, from http://www.paypal.com/cgi-bin/webscr?cmd=_pdn_cart_techview_outside, 2 pages.

PayPal, Inc., "PayPal® Integration Guide," May 2004, retrieved from https://www.paypal.com/en_US/pdf/integration_guide.pdf, pp. 1-157, Copyright 2004.

Identrus LLC, "Identrus Unveils World's First Global, Bank-Backed B2B e-Payments Solution Standard," Dec. 17, 2001, retrieved Jul. 16, 2004, from http://www.identrus.com/company/press_releases/us/release_011217.html, 2 pages.

"PKI-Enabled B2B Payment Products," System News, Inc., Sun One vol. 31, Issue 1, Sep. 11, 2000, retrieved Jul. 16, 2004, from http://sun.systemnews.com/articles/31/1/iplanet/2619, 3 pages.

Identrus LLC, "Identrus Member Financial Institutions Develop Internet Payment Initiation Services," Sep. 11, 2000, retrieved Jul. 19, 2004, from http://www.identrus.com/company/press_releases/us/release_000911_a.html, 1 page.

* cited by examiner

Example Interactive Creation Of User Account By Web Service Provider ABC

Welcome, Web Service Provider ABC! Please provide the information below to create your account for use with the WS Payment Handler System ("PHS"). — 111

1. Specify a name and password for your account.

name: [WSP-ABC]     password: [********]
optional organization affiliation(s): [ABC; Certified Web Service Provider Association]
optional certification(s): [BCDCorp:Trusted]
— 113

2. Optionally specify one or more payment repositories for payments that you receive. Your PHS account (named "MyPHSAccount") can also be used as a payment repository.

| Repository Name & Type | Repository Number & Expiration | Restrictions | |
|---|---|---|---|
| [ABC-Biz] [bank account ▼] | [123456789-123-456789] [<none>] | [<none> ▼] | |
| [PerDCard] [debit card ▼] | [1234-5678-1234-5678] [12/06] | [min. pay. ▼] | [$0.05] |
| [ ] [<none> ▼] | [ ] [ ] | [<none> ▼] | |

— 114

3. Optionally specify one or more payment instruments for payments that you make. Your PHS account can also be used as a payment instrument up to a $1000 limit.

| Repository Name & Type | Repository Number & Expiration | Restrictions | |
|---|---|---|---|
| [ABC-Biz] [bank account ▼] | [123456789-123-456789] [<none>] | [max. pay. ▼] | [$50.] |
| [PerCCard] [credit card ▼] | [1234-5678-5678-1234] [01/06] | [max. bal. ▼] | [$2000.] |
| | | [AND ▼] [max. pay. ▼] | [$200.] |
| [ ] [<none> ▼] | [ ] [ ] | [<none> ▼] | |

— 115

[Cancel] — 116a
[Create Account] — 116b

FIG. 1A

Example Interactive Creation Of Usage Instruction Rule Set By Web Service Provider User ABC Welcome, Web Service Provider ABC! Please provide the information below to create a usage instruction rule set for use with your WSP-ABC account. ⎬ 117 usage instruction rule set name: [ TrustedCustomerOfMyMapService ]
for use as: [payment-recipient ▼]   payment repository: [PerDCard ▼]
expiration date: [<none>]

Specify one or more rules for this usage instruction rule set.

| Rule Attribute | Criteria | | Value |
|---|---|---|---|
| [AllowedPayers ▼] | [Payer.OrganizationAffiliation ▼] | [IS ▼] | [Company XYZ] |
| [OR ▼] | [Payer.Rating ▼] | [IS ▼] | [BCDCorp:Trusted] |
| [OR ▼] | [Payer.ID ▼] | [IS ▼] | [4215345829] |
| [DisputeResolutionPolicy ▼] | [exclusive remedy is refund ▼] | | |

[ ▼ ]

| | |
|---|---|
| AllowedPayers | *(default value: <all>)* |
| DisallowedPayers | *(default value: <none>)* |
| AllowedTransactionTypes | *(default value: <all>)* |
| DisallowedTransactionTypes | *(default value: <none>)* |
| DisputeResolutionPolicy | *(default value: <any>)* |
| DisputeTimeWindow | *(default value: 30 days)* |
| AllowedPaymentInstrumentTypes | *(default value: <all>)* |
| DisallowedPaymentInstrumentTypes | *(default value: <none>)* |
| AllowedCurrencies | *(default value: US dollars)* |
| DisallowedCurrencies | *(default value: <all>)* |

⋮

---OR---
<User-Defined-Rule ("UDR")>

⎬ 118

[ Create Current Usage Instruction Rule Set And Continue With Another ]
[ Create Current Usage Instruction Rule Set And Exit ]
[ Skip Usage Instruction Rule Set Creation And Exit ]

Example Programmatic Creation Of Usage Instruction Rule Sets
Using XML Documents By Application Developer User CDE

```
<?xml version="1.0" ?>
<!DOCTYPE usage-instruction-rule-set >

<USAGE-INSTRUCTION-RULE-SET>
    <ACCOUNT-ID>1348193287</ACCOUNT-ID>
    <UIRS-NAME>MyPremiumCommercialApplications</UIRS-NAME>
    <UIRS-USAGE>payment provider</UIRS-USAGE>
    <UIRS-PAYMENT-INSTRUMENT>MyPHSAccount</UIRS-PAYMENT-INSTRUMENT>
    <UIRS-EXPIRATION-DATE>01-01-2005</UIRS-EXPIRATION-DATE>
    <UIRS-RULES>
        <RULE>
            <RULE-ATTRIBUTE>Recipient</RULE-ATTRIBUTE>
            <RULE-CRITERIA>Recipient.ID</RULE-CRITERIA>
            <RULE-EVALUATION>IS-NOT</RULE-EVALUATION>
            <RULE-VALUE>6242453245</RULE-VALUE>
        </RULE>
        <RULE>
            <RULE-ATTRIBUTE>PaymentsAllowed</RULE-ATTRIBUTE>
            <RULE-EVALUATION>LESS-OR-EQUAL</RULE-EVALUATION>
            <RULE-VALUE>$1000</RULE-VALUE>
        </RULE>
    </UIRS-RULES>
</USAGE-INSTRUCTION-RULE-SET>
```
⎱ 131

```
<?xml version="1.0" ?>
<!DOCTYPE usage-instruction-rule-set >

<USAGE-INSTRUCTION-RULE-SET>
    <ACCOUNT-ID>1348193287</ACCOUNT-ID>
    <UIRS-NAME>SharewareApplicationAAA</UIRS-NAME>
    <UIRS-USAGE>access-authorizer</UIRS-USAGE>
    <UIRS-ACCESS-INFORMATION>
        <USERNAME>CDE-Company</USERNAME>
        <PASSWORD>aldkf32aM</PASSWORD>
    </UIRS-ACCESS-INFORMATION>
    <UIRS-RULES>
        <RULE>
            <RULE-ATTRIBUTE>User-Defined-Rule</RULE-ATTRIBUTE>
            <RULE-UDR-NAME>Allowed-Use</RULE-UDR-NAME>
            <RULE-INVOCATION>
                http://verify.cde.com/query?app=AAA&destination=[access-provider.name]
            </RULE-INVOCATION >
        </RULE>
    </UIRS-RULES>
</USAGE-INSTRUCTION-RULE-SET>
```
⎱ 133

*FIG. 1C*

Example WS Payment Handler System Databases

Account DB

| | 141 | 142 | 143 | 144 | 145 | 146 | 147 | 148 | 149 | 150 |
|---|---|---|---|---|---|---|---|---|---|---|
| | Account ID | User ID | Name | Password | Organization Affiliations | Certifications | Payment Repository IDs | Payment Instrument IDs | Current Account Balance | Maximum Account Balance |
| 140a | 3419872987 | 0819343244 | WSP-ABC | q3adouRT | ABC; Certified Web Service Provider Association | BCDCorp: Trusted | 3419811; 3204980 | 3419821; 3947429 | - | $1000. |
| 140b | 1348193287 | - | CDE-Corp | - | - | BCDCorp: Trusted | - | - | $231.25 | $500. |
| | ... | | | | | | | | | |

Payment Repository DB

| | 181 | 182 | 183 | 184 | 185 | 186 | 187 | 188 |
|---|---|---|---|---|---|---|---|---|
| | Payment Repository ID | Account ID | Name | Type | Number | Expiration Date | Restriction Types | Restriction Values |
| 180a | 3419811 | 3419872987 | ABC-Biz | bank account | 123456789-123-456789 | - | - | - |
| 180b | 3204980 | 3419872987 | PerDCard | debit card | 1234-5678-1234-5678 | 12/96 | min. pay | $0.05 |
| | ... | | | | | | | |

Payment Instrument DB

| | 191 | 192 | 193 | 194 | 195 | 196 | 197 | 198 |
|---|---|---|---|---|---|---|---|---|
| | Payment Instrument ID | Account ID | Name | Type | Number | Expiration Date | Restriction Types | Restriction Values |
| 190a | 3419821 | 3419872987 | ABC-Biz | bank account | 123456789-123-456789 | - | max. pay. | $50. |
| 190b | 3947429 | 3419872987 | PerCCard | credit card | 1234-5678-5678-1234 | 01/96 | max. bal.; max. pay. | $2000.; $200. |
| 190c | 7982348 | 8049582022 | CC1 | credit card | 0984-4328-2452-6754 | 03/98 | max. bal. | $10000. |
| | ... | | | | | | | |

*FIG. 1D*

Usage Instruction Rule Set DB

| | 161 | 162 | 163 | 164 | 165 | 166 | 167 | 168 |
|---|---|---|---|---|---|---|---|---|
| | UIRS ID | Account ID | Usage Token | Name | Use Type | Payment Repository/ Instrument | Expiration Date | Rule IDs |
| 160a | 243919845 | 3419872987 | 84331984091340 | TrustedCustomerOfMyMapService | payment-recipient | 3204980 | - | 0298452; 2343248 |
| 160b | 341290809 | 1348193287 | 7499327927459 2 | MyPremiumCommercialApplications | payment-provider | 1348193287 | 01/01/2005 | 0984970; 2934701 |
| | ... | | | | | | | |

Usage Instruction Rule DB

| | 171 | 172 | 173 | 174 | 175 | 176 | 177 |
|---|---|---|---|---|---|---|---|
| | Rule ID | UIRS ID | Rule Attribute | Criteria | Evaluation | Value | Connector |
| 170a | 0298452 | 243919845 | Payer | Payer.Organization.Affiliation; Payer.Rating; Payer.ID | IS; IS; IS; | Company XYZ; BCDCorp:Trusted; 4215345829 | OR; OR |
| 170b | 2343248 | 243919845 | DisputeResolutionPolicy | - | IS; | exclusive remedy is refund | - |
| 170c | 0984970 | 341290809 | Recipient | Recipient.ID | IS-NOT; | 6242453245 | - |
| 170d | 2934701 | 341290809 | PaymentsAllowed | - | LESS-OR-EQUAL; | $1000. | - |
| | ... | | | | | | |

*FIG. 1E*

PERFORMING AUTOMATICALLY AUTHORIZED PROGRAMMATIC TRANSACTIONS

TECHNICAL FIELD

The following disclosure relates generally to facilitating interactions between computing systems, and more particularly to performing transactions between parties that are automatically authorized in accordance with predefined authorization instructions of the parties, such as to authorize fee-based Web service programmatic transactions between executing application programs of the parties.

BACKGROUND

Various mechanisms exist to allow computers and executing software applications to programmatically interact. For example, remote procedure call ("RPC") protocols have long existed that allow a program on one computer to cause a program on another computer to be executed, and various object-oriented architectures such as CORBA ("Common Object Request Broker Architecture") and DCOM ("Distributed Component Object Model") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the World Wide Web ("Web") has provided additional opportunities for computers to inter-communicate. For example, much current Web use involves users interactively requesting Web pages from Web servers (e.g., via executing Web browser applications of the users) and receiving the requested information in response. In addition to such interactive user specification of requested information, there is also growing use of the Web to support the programmatic interaction of remote applications to exchange information via defined APIs ("application program interfaces"), such as via Web services.

Web services allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Although Web services allow various applications and computers to interact, the current implementations and uses of Web services have various limitations. For example, while some providers of Web services are willing to make their Web services available for free, the most useful and reliable Web services are often not freely available. Unfortunately, the mechanisms for providers of Web services and potential consumers of those Web services to agree upon payment and other terms for transactions can be time-consuming and difficult to use. Moreover, there may often be issues of security and trust that hinders such agreements, such that potential consumers may lack sufficient assurance that prospective Web service providers will reliably and accurately provide desired Web services, while Web service providers may lack assurance that their Web services will be used only by authorized consumers and only in accordance with any conditions specified by the providers. In addition, application developers may be reluctant to have their application programs invoke fee-based Web services if they cannot limit and control the use of such Web services by end-users of the application programs who would be making the calls to those Web services. Finally, easy-to-use mechanisms do not typically exist to allow Web service providers to collect specified payment for the use of their Web services by consumers.

Thus, it would be beneficial to provide a solution that addresses these and other problems associated with the use of Web services and/or that otherwise facilitates the interaction of computer systems and executing applications.

BRIEF DESCRIPTION OF THE DRAWINGS

FIGS. 1A-1E illustrate examples of defining usage instruction rule sets for use in authorizing programmatic transactions.

DETAILED DESCRIPTION

A software facility is described that facilitates interactions between computing systems, such as by in some embodiments providing a third-party transaction authorization system that automatically authorizes transactions between parties and/or financial payments for such transactions in accordance with private authorization instructions that were previously specified by the parties. In some embodiments, some or all of the transactions are programmatic transactions conducted between executing computer programs, such as transactions involving the use of Web services of Web service providers by application programs affiliated with Web service consumers. In addition, in some embodiments the transaction authorization system further provides authorized payments to one or more of the parties on behalf of one or more other parties. The transaction authorization system allows parties to transactions to automatically determine whether the transactions are authorized and to proceed with performance of the transactions if so.

Figure 8A:
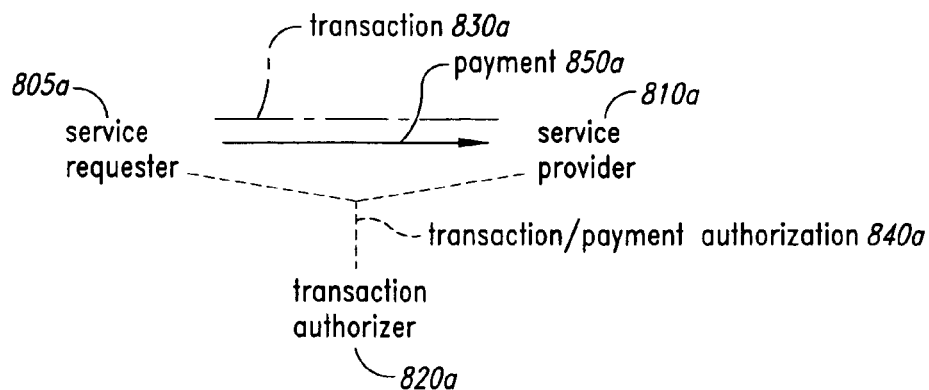
FIGS. 8A-8C, 9A-9B, and 10A-10C illustrates examples of types of interactions between parties to transactions.
Figure 8B:
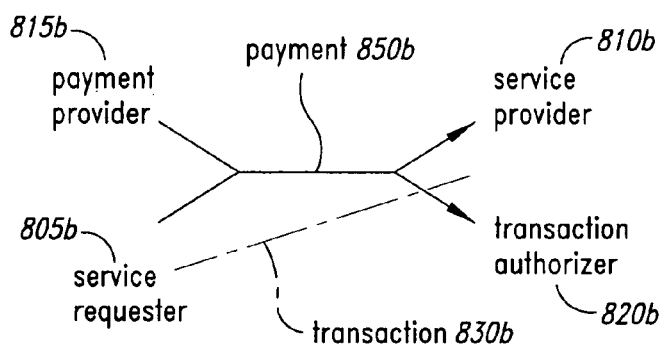
Figure 8C:
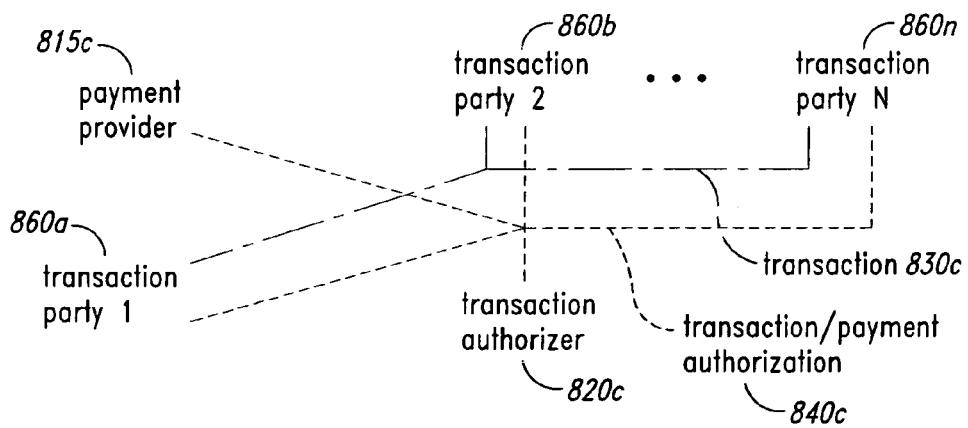

The transaction authorization system can be used to authorize transactions and/or payments for a variety of types of interactions between parties, with FIGS. 8A-8C illustrating examples of some such interactions. In particular, FIG. 8A illustrates an example of a 2-party transaction 830a in which a party 805a requests a service to be provided by a party 810a, with the providing of the service having an associated cost. A transaction authorization system 820a uses information about the parties 805a and 810a (e.g., information received from one of the parties who makes a programmatic call to the transaction authorization system requesting the authorization) in order to determine whether to authorize the transaction and/or the providing of a payment 850a from the service requester to the service provider to cover the cost associated with the transaction. After the transaction and/or payment is authorized, the transaction authorization system provides an indication of the authorization (e.g., as a response to the authorization request call), and may further in some embodiments actually make the authorized payment on behalf of the service requester. Details regarding how the authorization process 840a may occur are discussed in greater detail below.

The illustrated authorization and payment techniques can be used in a variety of situations. For example, the provided service may involve a programmatic transaction between the two parties (e.g., invocation by the service requester party of a Web service provided by the service provider party), or instead could involve other types of transactions (e.g., a physical transaction between the parties, such as providing a physical product or service from one party to the other). The authorization interactions with the transaction authorization system can similarly be performed in various ways, such as during the transaction (e.g., such that the transaction will not be completed unless an appropriate authorization response is received), or instead in a manner separate from the transaction (e.g., after the transaction is completed in order to provide payment to the service provider). In addition, the information regarding the parties that is used in performing the authorization may similarly have a variety of forms, as discussed in greater detail below.

FIG. 8B provides an example of a more complex payment 850b for a transaction 830b in which a party 805b requests a service to be provided by a party 810b. In this example, after the transaction authorizer 820b authorizes the transaction (not shown), portions of the payment may be provided to both the service provider 810b and the transaction authorizer 820b (e.g., based on the transaction authorizer charging a fee for performing the authorizing of the transaction and/or payment), and portions of the payment may be provided by both the service requester and one or more other payment providers 815b (e.g., an application developer that provided an application program being executed by the service requester). In other situations, payments between the various parties could be provided in other ways, such as if the payment provider(s) provide all of the payment, if the payment provider(s) provide the portion of the payment going to one of the service provider and the transaction authorizer and the service requester provides the portion going to the other of the service provider and the transaction authorizer, etc.

FIG. 8C provides an example of a more complex transaction 830c having multiple participating parties 860a-860n. In this example, some or all of those parties, as well as one or more other payment providers 815c, may provide information to or otherwise interact with the transaction authorizer 820c to allow the transaction authorizer to determine whether the transaction and/or any associated financial payment is authorized. After the authorization process 840c provides approval, payments (not shown) may be made by one or more of the participating parties and/or the payment provider(s) to other of the participating parties and/or the transaction authorizer.

As previously noted, the transaction authorization system can use various information about the parties to a transaction when determining whether to authorize transactions. In particular, users that are potential parties to such transactions may first define usage instruction rule sets of one or more types with the transaction authorization system for later use in authorizing the transactions, such as payment instruction rule sets for use in authorizing fee-based transactions and/or the associated financial payments for such transactions. Each such payment instruction rule set for a party may include one or more specified rules that regulate the conditions under which the payment instruction rule set can authorize a potential transaction for the party and/or its associated financial payment, as discussed in greater detail below.

For example, a potential Web service consumer (e.g., an application developer who would like their application program to be able to invoke Web services under specified circumstances) may specify rules for a payment instruction rule set that limits the financial exposure to the Web service consumer of the transactions that can be authorized by that payment instruction rule set (e.g., via a number of times that the payment instruction rule set can authorize a transaction, a maximum payment amount per transaction that the payment instruction rule set can authorize, a maximum total payment amount that the payment instruction rule set can authorize, an expiration date for the payment instruction rule set, etc.). Similarly, a potential Web service provider may specify rules for a payment instruction rule set that limits the liability to the Web service provider for the transactions that can be authorized by that payment instruction rule set (e.g., limitations on consumers that can purchase access to the Web service, limitations on types of payment that can be used to purchase access to the Web service, limitations on remedies available to consumers that are unhappy with their use of the Web service, etc.). In addition, a potential Web service caller (e.g., an end user of an application program supplied by an application developer that invokes one or more Web services) may specify rules for a payment instruction rule set that limits the liability to the caller for the transactions that can be authorized by that payment instruction rule set (e.g., limitations on types of programmatic transactions that the caller is authorized to initiate and/or on types of payments that can be made to purchase access to a programmatic service, such as payments to providers of the services and/or fees paid to a transaction authorization service and/or other third-party service such as a payment service).

After receiving a specified usage instruction rule set for a user, the transaction authorization system stores the instruction rule set in a manner associated with the user (e.g., associates it with an account of the user with the transaction authorization system), optionally after first approving the instruction rule set (e.g., based on verification that the instruction rule set includes required information, if any, and/or is in the correct form). The transaction authorization system also generates a reference token to refer to the instruction rule set, associates the reference token with the instruction rule set (e.g., by storing an indication of the reference token with the stored instruction rule set), and provides the reference token to the user for later use in referencing the instruction rule set. As discussed in greater detail elsewhere, the reference tokens can be generated in a variety of ways and can take a variety of forms (e.g., a long random number guaranteed to be unique), and in some embodiments multiple reference tokens may be generated for and associated with a single instruction rule set. In some embodiments, the reference tokens are generated in such a manner as to allow anonymous and/or private use of a reference token by a user, such as by lacking any identification information related to the user and/or by lacking any information about the conditions of the instruction rule set associated with the reference token (e.g., to prevent other parties to a potential transaction that involves such a reference token from obtaining such information about the user and/or associated instruction rule set).

After the usage instruction rule sets have been defined and associated reference tokens have been generated, they can then be used to allow automatic authorization of programmatic transactions in accordance with the previously defined conditions of the instruction rule sets. In particular, in some embodiments two or more parties to a potential programmatic transaction (e.g., a Web service provider party, a Web service consumer party, and optionally an end-user caller party) each supply a reference token for use in authorizing the potential transaction, as well as various information about the potential transaction. Those reference tokens and various information about the potential transaction can then be supplied to the transaction authorization system for automatic determination of whether the transaction is authorized (e.g., a dynamic determination, such as in a real-time manner). As discussed in greater detail below, in some embodiments the automatic determination by the transaction authorization system of whether a potential transaction is authorized based on the supplied reference tokens includes retrieving the instruction rule sets associated with those reference tokens and then determining whether the instruction rule sets are compatible.

The information about a potential transaction that is supplied to the transaction authorization system may vary in various embodiments and situations. For example, the information about the transaction may in some situations be limited to merely a transaction amount to be paid by one of the parties to another of the parties, while in other situations a variety of additional details about the transaction may be supplied (e.g., a type of the transaction). Furthermore, in some situations the call to the transaction authorization system can further specify details about what (if any) each of the two or more parties to the potential transaction are to pay, whether to another party and/or as fees to the transaction authorization system.

The determining of whether usage instruction rule sets are compatible can be performed in various ways in various embodiments, such as by determining if each rule in each instruction rule set is satisfied for the current potential transaction. Such rule satisfaction can occur in various ways for different types of rules, such as based on information about the potential transaction (e.g., a type of transaction and/or an associated payment amount for the transaction), information about one or more other parties to the transaction (e.g., whether the parties satisfy specified criteria), information about one or more other instruction rule sets specified for the potential transaction (e.g., whether one or more corresponding rules in the other instruction rule set(s) match or are otherwise compatible with the rule), etc. Conversely, in some situations instruction rule sets may be determined not to be compatible because one or more of them (and their associated reference tokens) are invalid for a current potential transaction based on conditions at the time of the potential transaction, such as if the instruction rule set is not currently available for use (e.g., it has expired or is otherwise not currently available for use, such as based on a total number of allowable uses or total allowable payment amount having been exceeded) and/or if it cannot be used for the potential transaction.

When a potential transaction with one or more associated financial payments is automatically determined to be authorized, the transaction authorization system may in some embodiments further perform or facilitate the payment exchange between the parties as appropriate. For example, in some embodiments a payment providing user may have previously specified one or more payment instruments (e.g., a credit card, bank account, etc.), and if so a financial payment may be obtained from one or more of those payment instruments in an appropriate manner (e.g., from a payment instrument specified by a payment instruction rule set for the payment providing user). Similarly, a payment receiving user may have previously specified one or more payment repositories (e.g., a bank account, debit card, etc.), and if so a financial payment may be provided to one or more of those payment repositories in an appropriate manner (e.g., to a payment repository specified by a payment instruction rule set for the payment receiving user).

After the transaction authorization system authorizes a potential transaction and optionally performs any associated financial payments for the potential transaction, the parties to the transaction can then perform the transaction in an appropriate manner. For example, when the transaction is a fee-based Web service transaction, the Web service consumer can invoke the Web service and the provider of the. Web service can provide the associated functionality for the Web service to the consumer.

In some embodiments, additional restrictions may be imposed by the transaction authorization system even after a potential transaction is authorized and/or performed. For example, in some situations recipients of payments may not be allowed to immediately withdraw or receive those payments, such as by limiting access to an account of the transaction authorization system in which the payment has been deposited and/or by delaying deposit of some or all of a received payment into another payment repository for the recipient. Such payment access restrictions may be performed for various reasons and in various ways, including to allow any disputes to be resolved and any refunds to be automatically made (e.g., as a chargeback to the payment recipient for the amount of the refund) during a specified period of time after the transaction is authorized and/or performed. In some embodiments, additional related functionality may further be provided by the transaction authorization system or from a third-party, such as a fee-based underwriting or insurance service that guarantees or provides the funds for any such refunds, thus allowing a payment recipient to have immediate or more rapid access to any received payments.

In some embodiments, users of the transaction authorization system may more generally define other types of usage instruction rule sets for use in situations other than authorizing fee-based transactions, whether instead of or in addition to payment instruction rule sets. For example, such usage instruction rule sets can each include one or more specified rules that regulate the conditions under which the usage instruction rule set can authorize a potential transaction that does not include a fee, such as to determine whether to provide access to restricted information or a restricted service.

In addition, the rules in usage instruction rule sets can be specified and used in various ways in various embodiments, and further can have a variety of forms in various embodiments. For example, in some embodiments a rule may specify a type of information to examine, a type of evaluation to perform with respect to that information, and a test for determining whether the results of the evaluation satisfy the rule. More generally, in other embodiments a rule may reflect any condition or information that can be examined and/or evaluated to determine whether it is satisfied in a specified situation. For example, in some embodiments a rule can be specified using XML format, and the instruction rule sets can further in some embodiments be specified and/or stored as XML documents.

Furthermore, in some embodiments users may select from a variety of predefined types of rules when creating usage instruction rules sets, such as with each predefined type of rule specifying a type of condition related to use of an instruction rule set and with each user selection including specifying one or more parameter values to customize the predefined rule type so as to affect how or when its usage condition is satisfied for the instruction rule set being created. In addition, in some embodiments users may specify various user-specific rules, such as rules that each indicate a user-specified procedure for determining when a rule is satisfied (e.g., by providing executable code for the rule that when invoked provides an indication as to whether the rule is satisfied, or instead by indicating a way to automatically obtain a response indicating whether the rule is satisfied, such as by invoking an accessible user-specified Web service or other function using specified parameter values).

In some embodiments, an evaluation of a rule may further involve obtaining additional information to be used as part of the determination as to whether the rule is satisfied, such as in an automated manner and/or in an interactive manner with respect to one or more users (e.g., by querying the user that created the instruction rule set to confirm an evaluation and/or to provide additional information). Moreover, in some embodiments in which functionality related to security and/or privacy for a usage instruction rule set is provided, one or more of the rules in the instruction rule set may be used to provide that functionality (e.g., by restricting who can access and/or modify the instruction rule set), while in other embodiments such functionality may be provided in other manners (e.g., by controlling access to a user account with which one or more instruction rule sets can be associated).

In addition, payment/usage instruction rule sets and their rules can be created in various ways in various embodiments, such as interactively via a graphical user interface ("GUI") provided by the transaction authorization system and/or via invocation of one or more Web services provided by the transaction authorization system for that purpose. Such Web services may be implemented in various ways, such as using APIs based on XML over HTTP (e.g., as part of the REpresentational State Transfer, or "REST", distributed interaction model that focuses on resources) and/or on the use of SOAP and/or other protocols related to Web services. Furthermore, after an instruction rule set has been created and associated with a reference token, the instruction rule set may in some embodiments not be allowed to be modified. Alternatively, in some embodiments such an instruction rule set may be modified, and a new reference token for the modified instruction rule set will be generated for the new instruction rule set (e.g., to replace the prior reference token). Moreover, in some embodiments reference tokens and/or associated instruction rule sets may be dynamically created at the time of intended use (e.g., as part of or just prior to attempting to invoke a programmatic service and/or to sending an authorization request to a third-party authorizer)—as one example, one-time or single-use tokens and/or instruction rule sets may be created and used (e.g., for a specific potential transaction) in some embodiments.

Furthermore, in some embodiments in which fee-based transactions are authorized and financial payments are handled, some or all of the users may further have an account with the transaction authorization system that facilitates such payments, such as an account that can be used by a user as a payment instrument and/or a payment repository. Such accounts and/or other financial instruments/repositories may in some embodiments support micro-payments of very small amounts. In addition, in some embodiments the transaction authorization system may further provide aggregation of financial payments to be provided and/or received (e.g., on a periodic basis, such as a month), such as to minimize fees associated with financial payment transactions and/or to allow minimum payment amounts to be reached. As with other types of accounts, such user accounts may in some embodiments have various conditions and restrictions related to their use, such as a maximum allowed credit balance, as well as various security and access control (e.g., password-based).

In addition, while the transaction authorization system has been described above as providing a variety of functionality and capabilities in various embodiments, in some embodiments some of such functionality and capabilities may instead be split across one or more systems. For example, in some embodiments some or all users may already have user accounts with another system with which the transaction authorization system is affiliated or to which the transaction authorization system otherwise has access, and if so some or all of the account-related functionality may be provided by that other system in conjunction with the transaction authorization system (e.g., the storing of instruction rule sets, the generating of reference tokens, the providing of payment repository/instrument functionality, etc.).

For illustrative purposes, some embodiments of the software facility are described below in which various specific types of capabilities and functionalities are performed by a specific embodiment of a transaction authorization system, and in which users define and use specific types of instruction rules sets in specific ways, such as payment instruction rule sets to authorize various types of fee-based programmatic transactions. However, those skilled in the art will appreciate that the techniques of the invention can be used in a wide variety of other situations, including with services and items other than Web services and for purposes other than providing financial payment, and that the invention is not limited to the exemplary details provided.

Figure 2:
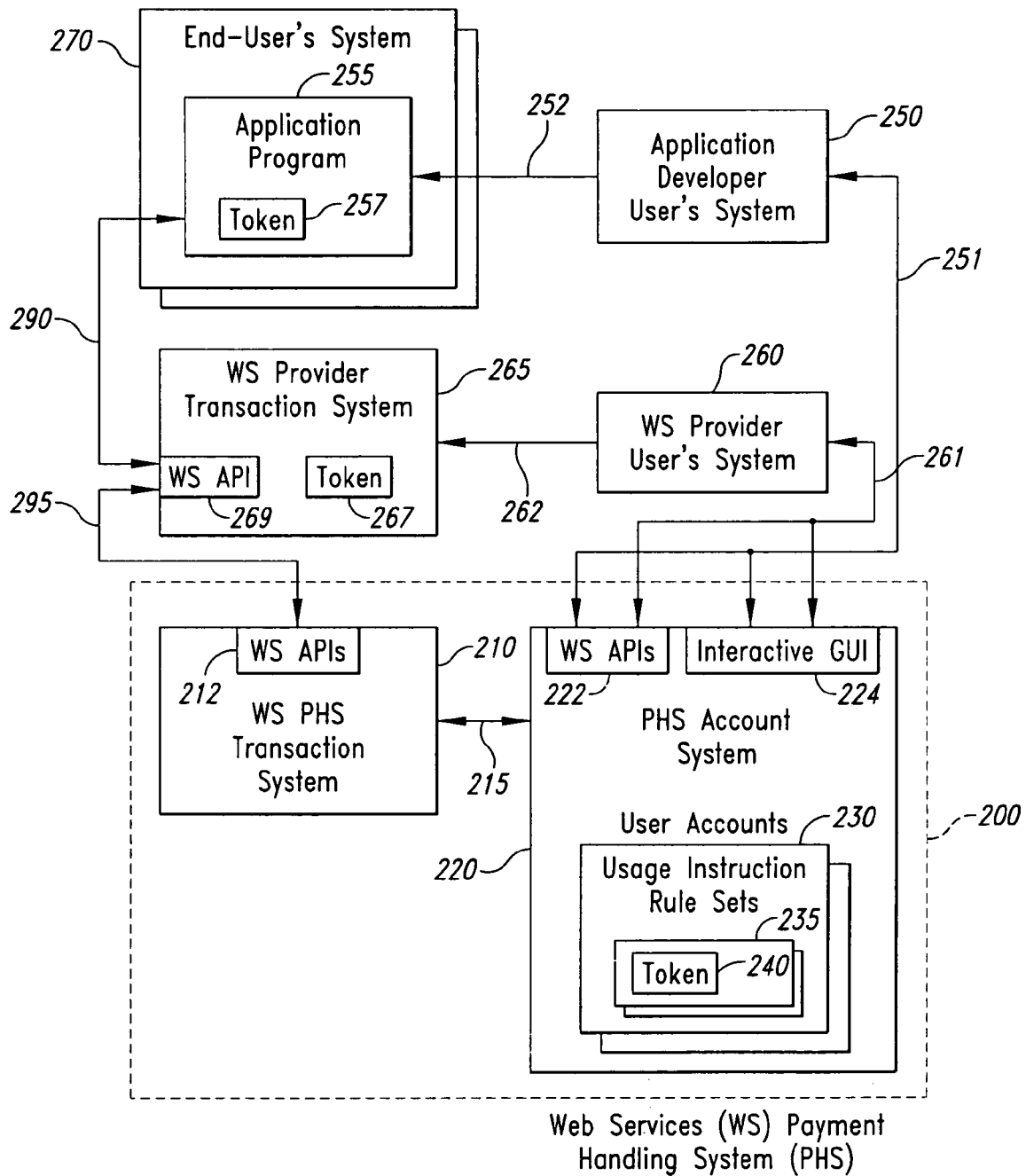
FIG. 2 is a network diagram illustrating components and information flow of an example embodiment of a Web services Payment Handling System.

FIG. 2 is a network diagram illustrating components and information flow of an example embodiment of a Web services ("WS") Payment Handling System ("PHS") financial transaction authorization system 200. Various users and systems interact with the PHS in the illustrated example to receive payment handling functionality, such as for transactions that occur between the users and/or systems. In the illustrated embodiment, the PHS includes both an Account System 220 and a Web services Transaction System 210, as discussed below.

In particular, in the illustrated embodiment a user (not shown) performing application development uses a computing system 250 to interact 251 with the PHS to enable later payment handling functionality on behalf of the application programs developed by the user. The application developer user's computing system 250 first interacts with the Account System to define a user account 230 for the application developer, such as via an interactive GUI 224 provided by the Account System or instead via one or more Web services APIs 222 provided by the Account System. In the illustrated embodiment, each such user account may include one or more usage instruction rule sets 235 that each specify various rules regarding how and when the usage instruction rule set can be used for payment purposes. In addition, each usage instruction rule set has an associated unique reference token 240 for later referencing of that usage instruction rule set. After the application developer user creates the account with one or more usage instruction rule sets, the user then includes one or more of the reference tokens 257 for the usage instruction rule sets within one or more application programs 255 that they create.

Similarly, one or more users (not shown) that provide Web services to others use a computing system 260 to interact 261 with the Account System via the interactive GUI and/or Web services APIs of the Account System. As with the application developer, each Web services provider user can create an account with one or more usage instruction rule sets with the Account System. The Web services provider user can then associate one or more of their reference tokens 267 for their usage instruction rule sets as part of one or more Web services Provider Transaction Systems 265 with which the Web services provider provides Web services to others (e.g., for a fee).

When one of the application programs 255 is later being executed by an end user (not shown) on an end-user computing system 270, the application program invokes 290 one or more Web services provided by the Web services Provider's Transaction System, such as via a Web services API 269. However, the Web services provider in the illustrated embodiment will provide the requested Web service only if appropriate payment is provided for the application program. Thus, in the illustrated embodiment, the application program supplies a reference token 257 of the application developer user as part of the Web service invocation. Before providing the requested Web service to the application program, the Web services Provider Transaction System then contacts 295 the PHS Transaction System 210 to obtain appropriate authorization and payment, such as via invocation of a Web services API 212 of the PHS Transaction System. In the illustrated embodiment, the Web services Provider Transaction System provides the reference token 267 for the Web services Provider as well as the reference token 257 from the application program as part of the interaction with the PHS Transaction System, and further provides information about the transaction and associated payment that is to occur. While not illustrated here, in some embodiments the one or more Web services provided by the Web services Provider's Transaction System 265 and the reference token 267 may be part of one or more application programs of the Web services provider, such as application programs provided as part of a Web site (not shown) of the Web services provider.

The PHS Transaction System 210 determines if the payment transaction is approved in the illustrated embodiment by first interacting with the Account System 220 to retrieve information about the usage instruction rule sets 235 corresponding to the reference tokens provided in the call to the Web service API 212, as well as further retrieving other information from the user accounts 230 to which those usage instruction rule sets belong. After obtaining the usage instruction rule sets and other information, the PHS Transaction System 210 then determines whether the rule sets are compatible and otherwise authorize the requested payment to be made, and if so the PHS Transaction System performs the payment (e.g., by charging a payment instrument associated with the application program's reference token 257 and by depositing at least some of that charge in a payment repository associated with the Transaction System 265's reference token 267) and provides confirmation to the Transaction System 265, with the Transaction System 265 subsequently providing the initially requested Web service to the application program. In some embodiments, the PHS may further obtain payment for some or all of the services it provides, such as a portion of the payment for each transaction performed and/or a payment associated with account creation and/or modification.

Although the PHS Transaction System 210 and Account System 220 are illustrated in this embodiment as being separate but cooperating systems, in other embodiments the illustrated functionality can be provided in other ways. For example, in some embodiments a single system may provide both the account creation and maintenance capability as well as the transaction authorization and handling capability, while in other embodiments the Transaction System 210 and Account System 220 may instead be provided by unrelated systems/organizations.

In addition, while only payment-type transactions are illustrated here, in other embodiments a variety of other types of transactions could be performed, whether instead of or in addition to a payment transaction. Moreover, while the illustrated embodiment discusses a per-use fee for using the Web service of the Transaction System 265, in other embodiments a variety of other types of purchase transactions could be performed, such as an ongoing subscription to one or more Web services of the Transaction System 265 for one or more application programs 255. Alternatively, a specified number of uses of the Web service or an unlimited number of uses during a specified period of time may instead be purchased and associated with the reference token 257, such as by the application developer user before distributing the application program 255 to the end users. In such situations, information about the subscription or other multi-use purchase may be stored by the Account System in various ways so that the Transaction System 210 will later be able to determine that a payment transaction is authorized. Additional details regarding automatically authorizing programmatic transactions using usage instruction rule sets are included in related U.S. patent application Ser. No. 10/894,347, filed concurrently and entitled "Automatic Authorization Of Programmatic Transactions", which is hereby incorporated by reference in its entirety.

Figure 9A:
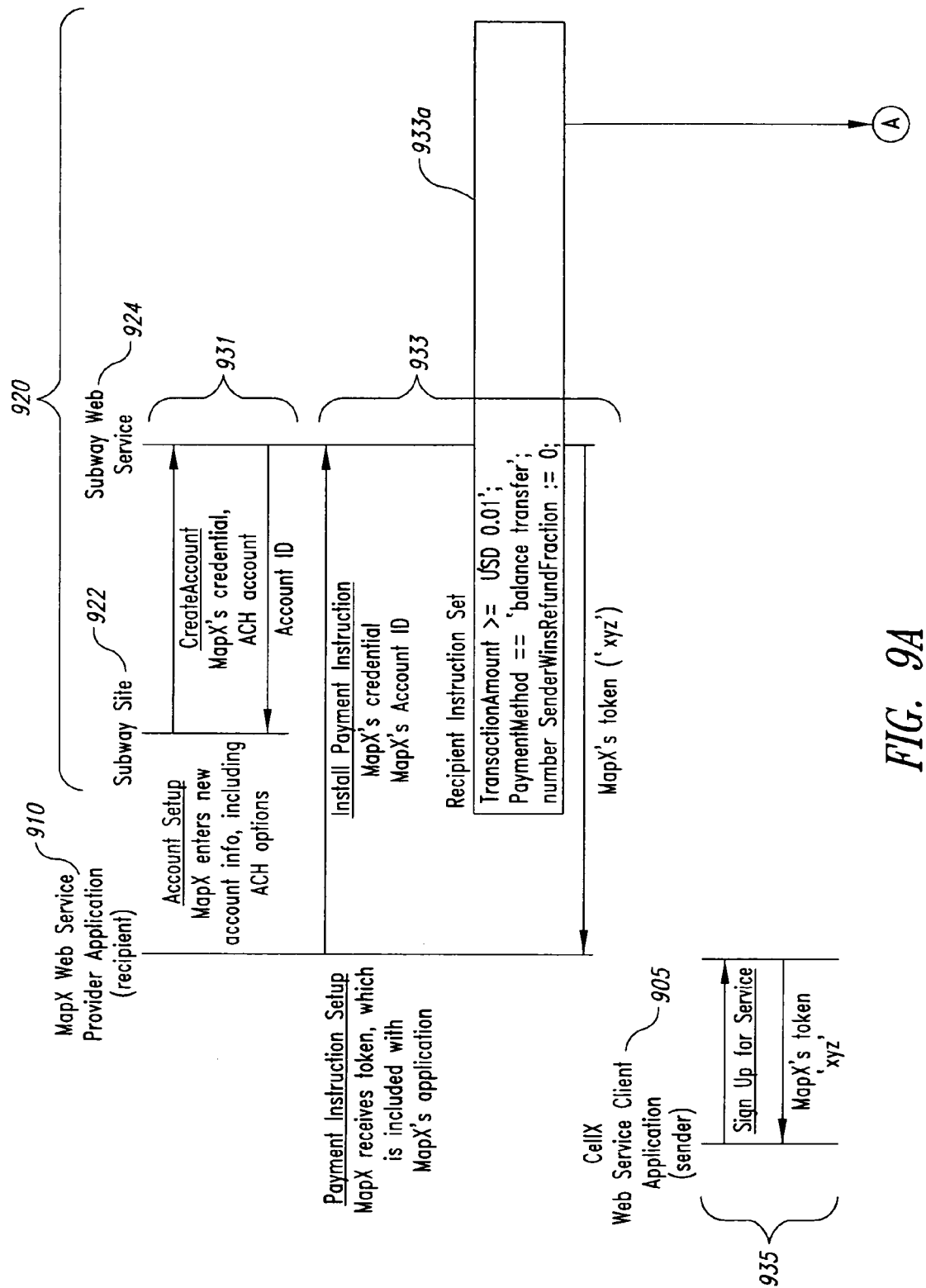
Figure 9B:
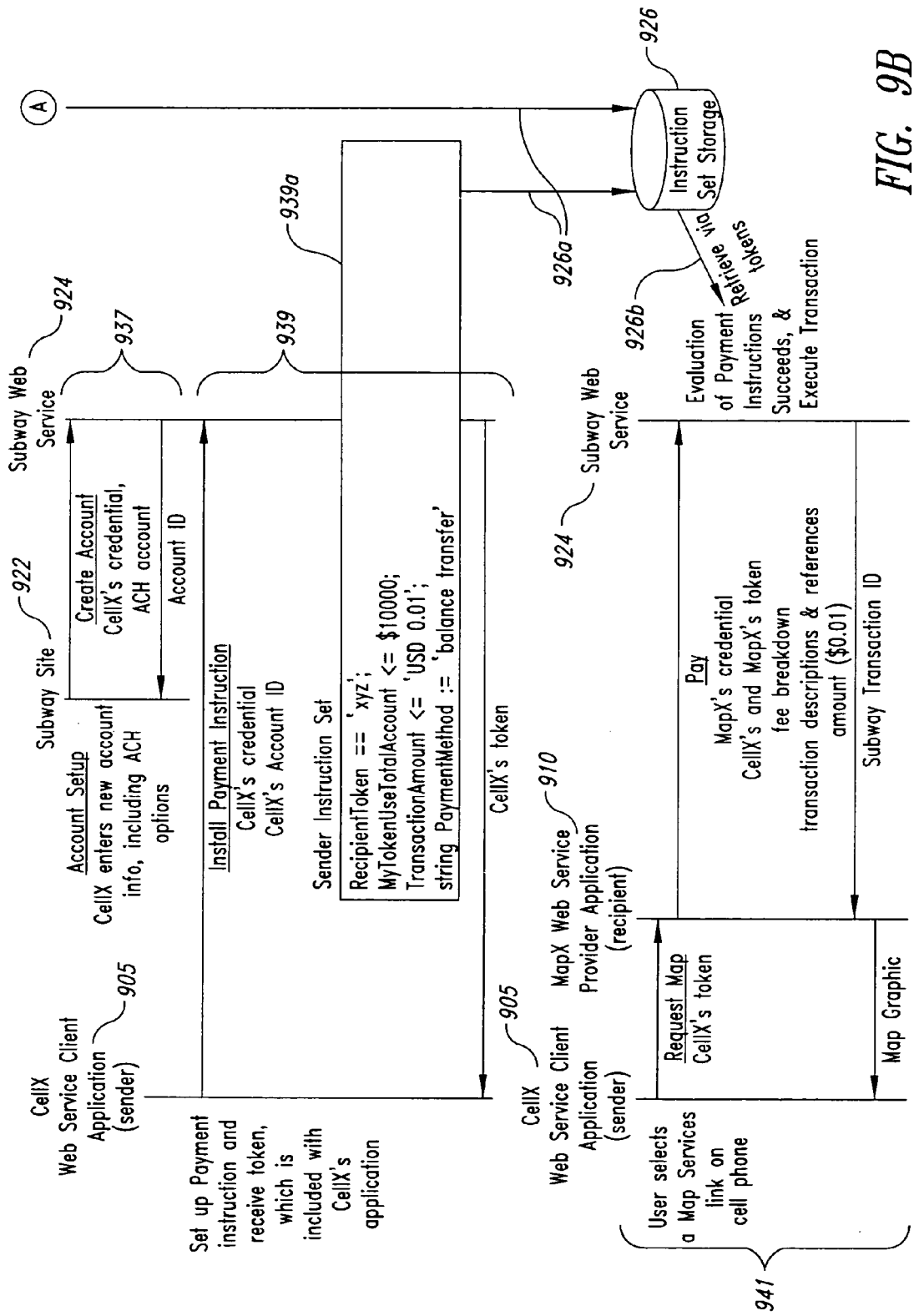

FIGS. 9A-9B and 10A-10C each illustrate an additional example of performing programmatic transactions that are automatically authorized by a third-party transaction authorization system (referred to as "Subway" for purposes of these examples). In particular, FIGS. 9A and 9B illustrate an example of making machine-to-machine micropayments for Web service-based programmatic transactions. In this example, a Web service provider referred to as "MapX" provides a Web service that serves maps by address for a fee of 1 cent per invocation or call. "CellX" is a potential Web service consumer of this Web service as part of a cellphone (or "mobile phone") service provided to various end-user customers. After CellX signs up for MapX's programmatic mapping service, CellX uses this MapX service to make maps available to its cellphone service customers.

The illustrated series of actions for the example in FIGS. 9A and 9B begins with a representative of MapX (not shown) performing interactive account setup actions 931 with the Subway transaction authorization system 920, and in particular using a Web site 922 provided by the Subway system 920 to specify information about MapX (e.g., credential information and Automated Clearing House (or "ACH") bank information for MapX). The Subway Web site 922 then interacts with a Subway Web service 924 to create an account for MapX by supplying the received information for MapX and by receiving an ID for the new account in response. A representative of MapX then initiates programmatic interactions 933 with a Subway Web service 924 to create a payment instruction rule set for MapX by supplying MapX's credentials, account ID and the rules 933a for the payment instruction rule set—such programmatic interactions by the MapX representative may include using a MapX Web service provider application 910 that will later provide the mapping Web service to consumers or, instead, using another program (not shown). The Subway system 920 stores 926a the payment instruction rule set in storage 926 and returns an associated token to the MapX representative, and the MapX representative includes the token with the MapX Web service provider application 910 for later use in authorizing transactions. After registering the payment instruction rule set, MapX is now able to use the MapX application 910 to offer its mapping Web service to potential consumers of the Web service.

A representative of CellX (not shown) then interacts 935 with the MapX application 910 to sign up for the MapX mapping service (e.g., by using an appropriate Web service of the MapX application 910 to perform the signup activities), and receives MapX's token in response. The CellX representative also performs account setup actions 937 with the Subway system 920 by interacting with the Subway Web site 922 to specify information about CellX, and receives an account ID in response. To obtain the account ID, the Subway Web site 922 interacts with a Subway Web service 924 to create the CellX account by supplying the information received from CellX. The CellX representative then initiates programmatic interactions 939 with a Subway Web service 924 to create a payment instruction rule set for CellX by supplying CellX's credentials, account ID and the rules 939a for the payment instruction rule set. The Subway system 920 then stores 926a the payment instruction rule set in storage 926 and returns an associated token to the CellX representative, and the CellX representative includes the token with a CellX application 905 that is available to CellX customers via the cellphone service from CellX. After registering the payment instruction rule set, CellX is now able to offer MapX's mapping Web service to its customers via the CellX application 905.

A customer of the CellX cellphone service then selects 941 functionality in the CellX application 905 that uses MapX's mapping functionality from the MapX application 910, such as by selecting a map-related link that is part of an online directory service of the CellX application 905. The user selection then causes the CellX application 905 to programmatically invoke a MapX Web service from the MapX application 910 in order to request a particular map corresponding to the customer's selection, with the invocation including supplying the CellX reference token previously associated with the CellX application 905. The MapX application 910 then submits to a Subway Web service 924 a pay authorization request that includes information about the transaction, MapX's credential, and the MapX and CellX reference tokens. The Subway system 920 then retrieves 926b the payment instruction rules sets for the reference tokens and uses them to determine that the transaction is authorized, performs the payment from CellX to MapX for the invocation, and returns a transaction ID to the MapX application 910 indicating the transaction authorization. The MapX application 910 then supplies the requested map to the CellX application 905, which displays the map to the customer. As one example of a possible implementation for the MapX application 910 and the CellX application 905, the CellX application 905 may operate in a manner similar to application program 255 previously described in FIG. 2, and the MapX application 910 may operate in a manner similar to an application program of the WS Provider Transaction System 265 that includes the WS API 269, as previously described in FIG. 2.

Figure 10A:
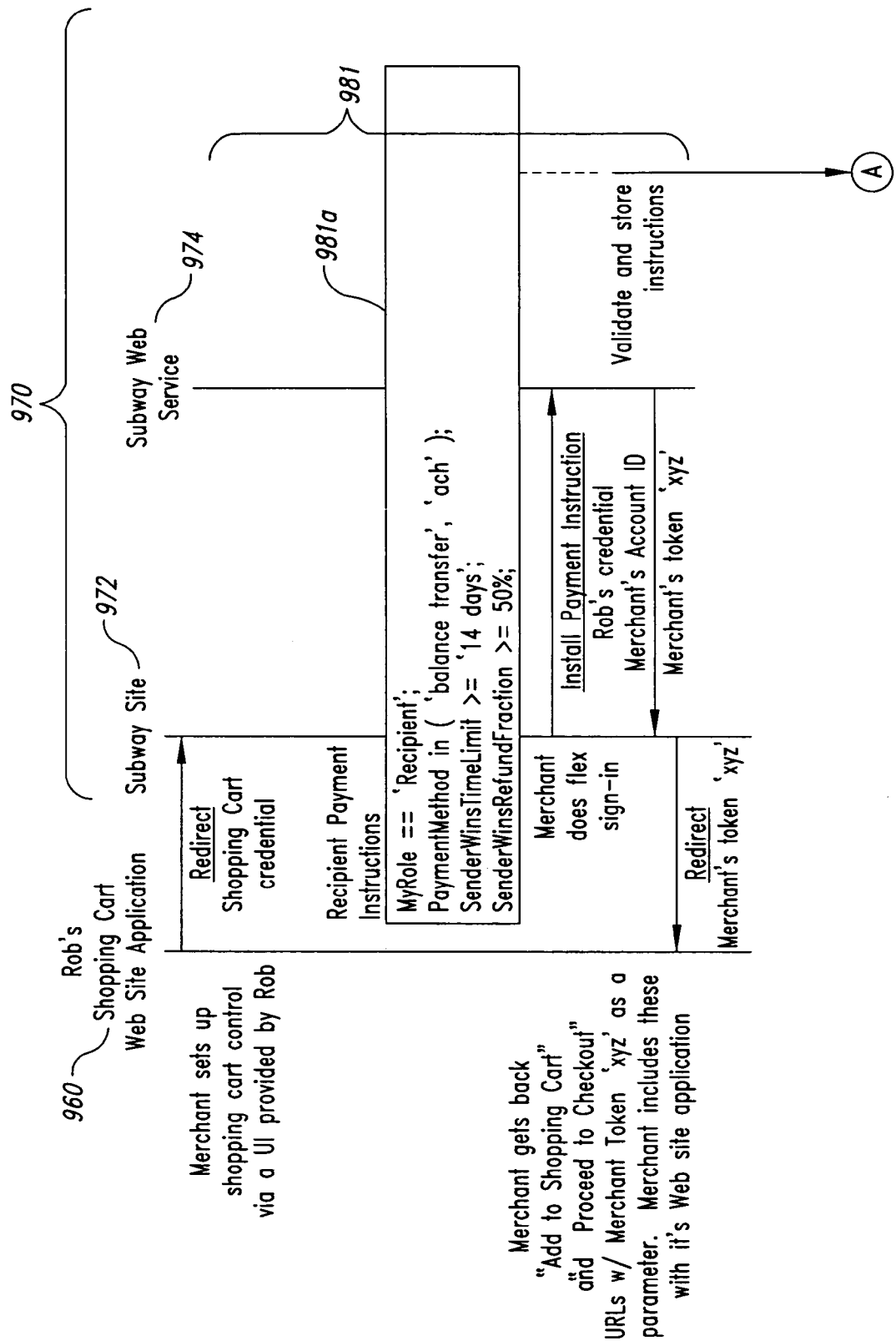
Figure 10B:
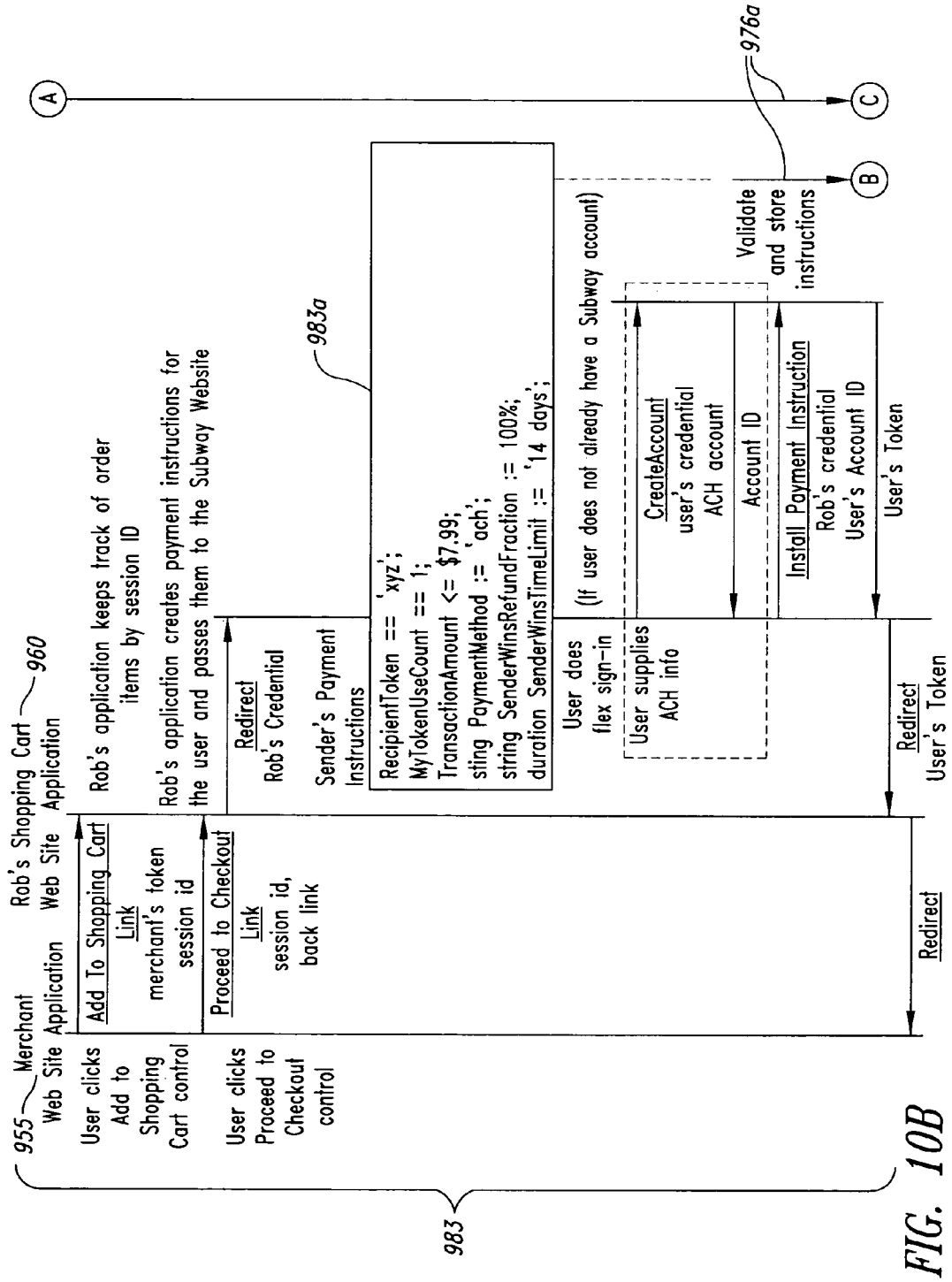
Figure 10C:
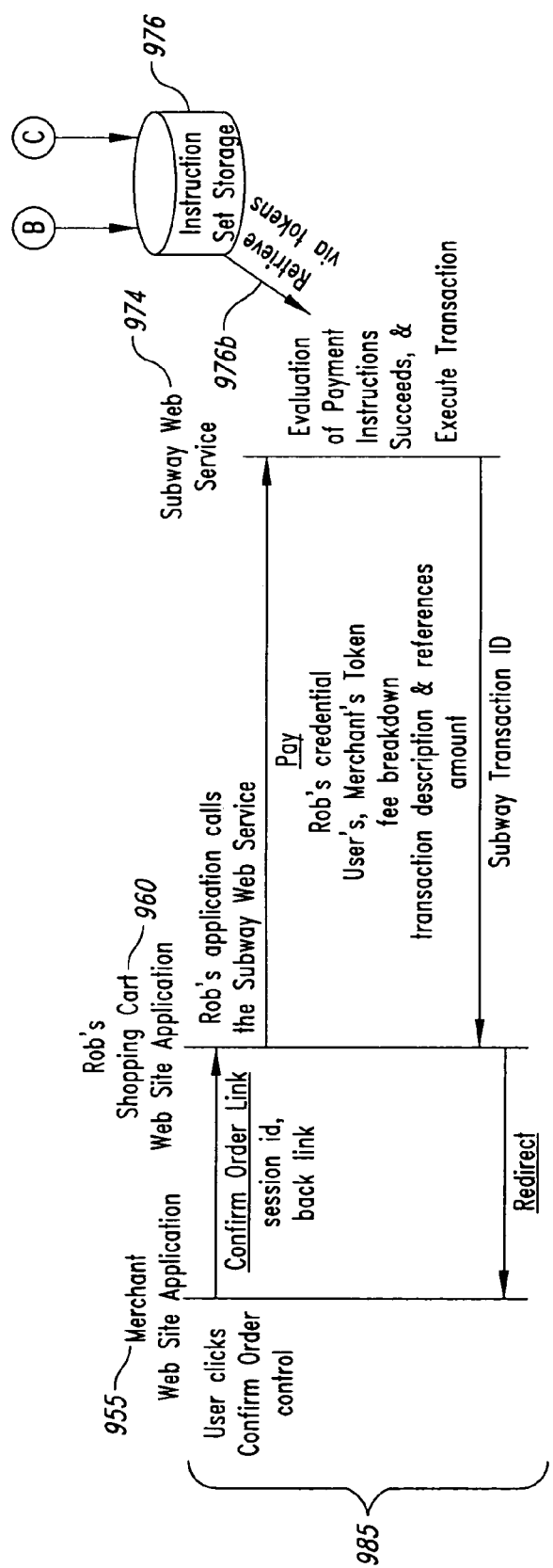

FIGS. 10A-10C illustrate another example of using payment instruction rule sets to authorize programmatic transactions, which in this example includes a user (named "Rob") who provides an application 960 to implement shopping cart functionality for third-party merchants via Web services. Such merchants can sign up for and use Rob's shopping cart functionality by including customer-selectable controls in the merchants' applications that interface with Rob's shopping cart application 960, which in turn maintains session information for each customer of each merchant. When customers check out via a merchant's application, Rob's shopping cart application 960 interacts with the Subway transaction authorization system 970 to process payments from the customers to the merchants.

The illustrated series of actions for the example in FIGS. 10A-10C begins with a representative of a merchant (not shown) performing interactive actions 981 to sign up for Rob's shopping cart service by interacting with Rob's shopping cart application 960, which first redirects the representative to the Subway transaction authorization system 970 to register a payment instruction rule set for the merchant. The merchant representative next interacts with a Web site 972 provided by the Subway system 970 to sign in (in this example the merchant already has an account with the Subway system 970) and to supply payment instruction rule information 981a to the Subway system 970. The Subway Web site 972 then interacts with a Subway Web service 974 to create a payment instruction rule set by supplying credentials for Rob's shopping cart Web site application 960, an account ID for the merchant, and the rules 981a for the payment instruction rule set. The Subway system 970 next stores 976a the payment instruction rule set in storage 976 and returns an associated token to the merchant via Rob's shopping cart Web site application 960. The merchant then includes customer-selectable controls related to shopping cart functionality as part of the merchant's Web site application 955, with the controls associated with appropriate URLs that use the merchant reference token as a parameter while invoking corresponding Web services provided by Rob's shopping cart Web site application 960.

A customer of the merchant then interacts 983 with the merchant's Web site application 955 to select an appropriate control to add an item to the customer's shopping cart, which causes information to be sent from the merchant application 955 to Rob's shopping cart Web site application 960 that includes a session ID for the customer and the reference token for the merchant. When the customer later indicates via the merchant Web site application 955 to proceed to checkout, the merchant application 955 sends information to Rob's shopping cart application 960, which in turn interacts with the Subway Web site 972 in order to dynamically specify a one-time set of payment instruction rules for the customer for the amount corresponding to purchasing the items in the customer's shopping cart. The customer is also prompted to sign in at the Subway Web site 972, including creating an account if need be. The Subway Web site 972 then proceeds to interact with a Subway Web service 974 to create the payment instruction rule set by supplying credentials for Rob's shopping cart Web site application 960, an account ID for the customer, and the rules 983a for the payment instruction rule set. The Subway system 970 next stores 976a the payment instruction rule set in storage 976 and returns an associated token for the customer to Rob's shopping cart Web site application 960.

When the customer of the merchant indicates placing an order by selecting a "Confirm Order" control via the merchant Web site application 955, the merchant application 955 sends an indication to Rob's shopping cart Web site application 960 that includes the session ID. Rob's shopping cart Web site application 960 then retrieves the reference token for the customer that was previously created, and submits a pay authorization request to a Subway Web service 974 that includes information about the transaction, the shopping cart Web site credential, and the reference tokens for the merchant and customer. The Subway system 970 next retrieves 976b the payment instruction rules sets for the reference tokens and uses them to determine that the transaction is authorized, performs the payment from the customer to the merchant for the transaction, and returns a transaction ID to Rob's shopping cart Web site application 960 indicating the transaction authorization.

FIGS. 1A-1B provide examples of interactions by users to create accounts and usage instruction rule sets for later use by a transaction authorization and handling system. In particular, FIG. 1A provides an example of a GUI via which a Web service provider user ABC interactively creates a user account, such as by filling in forms in a Web page provided by an Account System. In this illustrated example, the example interactive creation screen includes a heading area 111 with overview information, followed by an area 113 in which the user can specify various general information for the account, such as an account name, a password for access control to view and modify the account, any optional certifications, and any optional organization affiliations. In this example, user ABC specifies a certification from a third-party company BCD Corporation, as some usage instruction rule sets of potential consumers of the Web services provided by ABC may request such a certification in order to authorize payment to ABC. Similarly, user ABC indicates organization affiliations both to its own company and to an association of various Web service providers, as usage instruction rule sets of potential consumers of ABC's Web services may similarly request one or more such organization affiliations to authorize payment to user ABC.

In this example, the account creation screen also includes an optional section 114 in which the user ABC can specify one or more payment repositories for payments that the user may receive, such as for providing fee-based Web services to consumers. In this example embodiment, user ABC specifies two payment repositories in which incoming payments may be deposited, including a bank account and a debit card. The user further specifies restrictions for the debit card such that any payments deposited must be a minimum of at least five cents. The section 114 in this illustrated embodiment also indicates that the user account being created can itself serve as a payment repository for the user.

The account creation screen also includes a section 115 in which the user ABC can specify one or more payment instruments to be used for payments to be made to others. In this example, user ABC specifies the same bank account as an available payment instrument, although with a restriction that any individual payments from the account be no larger than $50, as well as a credit card payment instrument with restrictions of maximum individual payments of $200 and a maximum cumulative balance of $2,000. Section 115 similarly indicates that the user account being created can be used as a payment instrument by the user, which for this user and in this example includes a $1,000 maximum balance credit limit. After specifying the various types of information, the user can then select the control 116b to create the account, or the user can instead select the control 116a to cancel the account creation.

In the illustrated embodiment, after initially creating the user account, the user is then presented with the option of creating one or more usage instruction rule sets via the example screen shown in FIG. 1B. In particular, the illustrated screen includes a header section 117 with overview information and a rule specification section 118 in which various information can be specified for a usage instruction rule set being created. In this example, section 118 allows the user to specify a name for the usage instruction rule set being created, a usage type for the rule set (which in this example is to receive payments), a payment repository to receive any such payments, and an expiration date which in this example is not specified. The user ABC can also specify one or more specific rules for this rule set. The example illustrates two rules that have been defined, and a drop-down menu for a third rule showing other types of rule attributes that can be selected and customized for this usage instruction rule set in this example.

For example, user ABC has specified that this usage instruction rule set will only receive payments from users that satisfy the first "AllowedPayers" role attribute, which in this example can be satisfied based on a specified organization affiliation of the payer, rating of the payer, or specific payer whose ID is indicated. As is indicated, other rule attributes that can be specified in this example include disallowed or blocked payers from whom user ABC will not accept payment, specifications of allowed or disallowed transaction types with which the usage instruction rule set can be used, allowed or disallowed types of payment instruments and currencies for received payments, terms and conditions for later handling any disputes that occur, etc. In addition, the illustrated embodiment allows a user to specify a user-defined rule, such as by including executable code and/or a mechanism for invoking an accessible executable function (e.g., a Web service). After specifying the various information for the usage instruction rule set being created, the user ABC can then select one of the controls in section 109 to create the current usage instruction rule set and continue with creating another rule set for the account, to create the current usage instruction rule set and exit the account modification, or to skip the creation of a current instruction rule set and exit.

The types of rule attributes shown in this example are provided in a simplified manner for the purpose of example, and similar information could instead be specified in other ways in other situations. For example, rather than having different attributes for allowed and disallowed payers, a single attribute for payers could instead be provided, with the type of evaluation criteria instead used to determine whether a user is allowed or disallowed (e.g., to satisfy the rule, it is specified that the payer "IS" or "IS-NOT" a specified value). Additional details regarding example attributes are discussed elsewhere.

FIG. 1C illustrates an alternative technique for creating usage instruction rule sets for a user account. In particular, in this example embodiment, user accounts and usage instruction rule sets are created programmatically by a Web services consumer application developer user CDE, such as via one or more Web services provided by the WS Payment Handler System. In this example embodiment, the information supplied as part of the programmatic invocation includes the example XML document 131 illustrated in FIG. 1C. This example XML document specifies the account ID with which the usage instruction rule set being created will be associated (e.g., an account ID received by the user in response to an earlier programmatic invocation to create the user account), and further provides a variety of information similar to that specified in an interactive manner with respect to FIG. 1B.

In particular, this usage instruction rule set is being created by user CDE for use in providing payment for transactions that will be invoked by one or more application programs created by user CDE, such as fee-based Web services (e.g., one or more Web services provided by Web service provider user ABC). In this example, the usage instruction rule set being created will use user CDE's PHS account (designated in this example with the name "MyPH-SAccount"), and has a specified expiration date. The second of the two rules defined for the usage instruction rule set further limits the total payments that this usage instruction rule set can authorize to be less than or equal to the amount of $1,000 by using the predefined rule attribute "PaymentsAllowed" with an appropriate evaluation type and rule value. The first rule specified for the usage instruction rule set identifies a specific payment recipient with which the usage instruction rule set cannot be used, which in this example is specified with a general attribute of "Recipient" and appropriate evaluation type of "IS-NOT" rather than a more specific attribute type of "DisallowedRecipient". In other embodiments, corresponding information could be instead provided in a variety of other ways, including in XML documents using other formats and/or in ways other than with XML.

FIG. 1C also illustrates a second XML document 133 for creating another usage instruction rule set for user CDE's account, such as to accompany a second programmatic invocation to the WS Payment Handler System. In particular, this second usage instruction rule set illustrates an example of a usage instruction rule set for transactions of a type other than payment handling, such as to specify access control information in this example. For example, user CDE may have a subscription or other membership that provides access to one or more programmatic services or sources of information, but user CDE may wish to limit when such access rights are made available to one or more applications provided by the user. In this example, the usage instruction rule set being created in XML document 133 does not include an associated payment instrument, but does include various access information that includes a user name and password to be supplied to gain access in accordance with the subscription/membership—in other embodiment and situations, a variety of other types of access control information could instead be specified and used.

This usage instruction rule set also illustrates an example of the definition of a user-defined rule, which in this example is given a user-specified name of "Allowed-Use" (e.g., for later use in referencing this user-defined rule independently of any other user-defined rule, not shown), as well as a URI-based invocation specification that when executed as indicated will provide a response indicating whether the rule is satisfied. In this example, the invocation specification includes an indication of a parameter to be filled in with information specific to a particular potential transaction by replacing the parameter "access-provider.name" enclosed in square brackets with the corresponding name from the account for the usage instruction rule set of an access provider to which this usage instruction rule set is being matched for a particular transaction. Such a user-defined rule can make a determination as to whether the rule is satisfied in a specific situation in a variety of ways and using a variety of types of information, including information about the application using the usage instruction rule set and/or the end-user executing the application program. Similarly, user-defined rules can be defined and invoked in a variety of other ways in other embodiments, including by providing executable code (e.g., a script or applet) as part of the creation of the usage instruction rule set with which the user-defined rule will be associated.

FIGS. 1D and 1E illustrate several example databases for use in storing information about user accounts and usage instruction rule sets that have been created. In particular, FIG. 1D illustrates an example Account database 140 that stores various information about user accounts that have been created, with each of the entries 140a-140b corresponding to a distinct user account. In this example, each entry includes not only information specified by the user creating the account, but also information that is automatically generated for and associated with the account. For example, entry 140a corresponds to the user account whose creation was previously discussed with respect to FIG. 1A, with columns 143-146 including information specified by the user in section 113 of FIG. 1A. In addition, when the account was created, the PHS generated a unique account ID for the account, which is stored in column 141. Furthermore, in this example user ABC was already known to the PHS or an associated system before the creation of the PHS account in FIG. 1A, and column 142 includes a user ID for user ABC that was previously associated with the user (e.g., as part of a user account previously created for user ABC, such as with a Web merchant or store).

In addition, as previously discussed with respect to FIG. 1A, in this example embodiment the PHS provides for at least some of the users the ability to use their PHS account as a payment repository and/or payment instrument. Thus, columns 149 and 150 include information corresponding to that aspect of the user's PHS account, including a current balance on the account and a maximum balance allowed for the account (e.g., a maximum balance dynamically determined in a user-specific manner at the time of account creation and optionally adjusted as appropriate based on later experience with the user)—however, since user ABC does not use the PHS account as a payment repository or instrument in this example, the current account balance is zero. While not illustrated here, a variety of other types of information may be associated with an account, such as indications of transactions that have previously been performed for an account, changes that have occurred to the account, indications of other users and associated access controls for those users to access the account, etc. Entry 140b contains similar corresponding information for the account of user CDE previously discussed with respect to FIG. 1C.

Columns 147 and 148 of the Account database 140 include information about any payment repositories and payment instruments defined for use with a user account. In particular, the information in column 147 for entry 140a corresponds to the payment repositories specified in section 114 of FIG. 1A, and the payment instrument information in column 148 of entry 140a similarly corresponds to the payment instruments specified in section 115 of FIG. 1A. In this example, each payment repository and payment instrument is given a unique ID, which are stored in the columns 147 and 148, with additional example databases Payment Repository database 180 and Payment Instrument database 190 to store information about user-specified payment repositories and user-specified payment instruments, respectively. In this example embodiment, the payment repository and instrument databases each contain multiple entries 180a-180b and 190a-190c, respectively, to correspond to individual payment repositories and instruments.

In addition, the databases 180 and 190 store a variety of information for each repository or instrument, including an automatically generated ID in columns 181 and 191, indications of the account with which the payment repository or instrument is associated in columns 182 and 192, a user-specified name for the repository or instrument in columns 183 and 193, and various information in columns 184-186 and 194-196 regarding how to use the payment repository or instrument for payment deposits or charges, respectively. In other embodiments, a variety of other types of additional information may be provided and used, such as in a manner specific to the type of instrument and/or repository (e.g., using the full name of a user associated with a credit card in order to make a charge, but not using such information for a bank account). In addition, in this illustrated example the user can define one or more restrictions regarding use of a payment repository or instrument, as previously discussed, with such restriction information stored in columns 187-188 and 197-198 in this example.

While user ABC uses a single bank account as both a payment repository and a payment instrument (corresponding to entries 180a and 190a, respectively), in this example the bank account is given distinct IDs for each of these uses (as shown in columns 181 and 191 for those entries), although in other embodiments a single ID could instead be used. In addition, while not illustrated here, in other situations a single payment source or destination (e.g., a bank account) could be used with multiple defined payment repositories and/or multiple defined payment instruments, such as to define different restrictions or other conditions with different uses of that payment source or destination. In addition, in this example user CDE has not yet designated any user-specified payment repositories or user-specified payment instruments, instead using the PHS account as a payment instrument (since user CDE does not currently receive any payments, he/she does not currently need a payment repository).

FIG. 1E illustrates a Usage Instruction Rule Set database 160 that stores information about various defined usage instruction rule sets. In particular, entry 160a corresponds to the usage instruction rule set defined by user ABC in FIG. 1B, and entry 160b corresponds to the usage instruction rule set defined by XML document 131 in FIG. 1C. In this example, each usage instruction rule set is given a unique ID (as shown in column 161) and is further provided an automatically generated unique reference token for use in later reference to the usage instruction rule set (as shown in column 163). While in this example the reference token is a long random number, in other embodiments a variety of other types of information could be used for a reference token, and in general may include any information that can reference or otherwise indicate a payment instruction rule set. Examples of other types of reference tokens that can be used in some embodiments include a digital certificate or other credential, a public or private key of a key pair (if the PHS has access to the other key, such as by being associated with a user's account) and/or information encrypted using one of those keys (e.g., a copy of the usage instruction rule set associated with the reference token, information about the user to whom the reference token belongs, information about a potential transaction for which the reference token is being used, etc). The database 160 further includes a variety of other specified information for the usage instruction rule set, including the account ID for the account with which the usage instruction rule set is associated (as shown in column 162), a name and use type (as shown in columns 164 and 165), an optional expiration date (as shown in column 167), and an indication of one or more optional payment repositories or instruments for use with the usage instruction rule set (as shown in column 166).

The database 160 also includes an indication of the rules for the usage instruction rule set in column 168, which in this example are illustrated with rule IDs corresponding to those rules. Additional information about the rules is then provided in the Usage Instruction Rule database 170. In particular, each rule in this example has an associated unique rule ID (as shown in column 171) and an indication of the ID of the usage instruction rule set with which the rule is associated (as shown in column 172). Columns 173-177 include various information regarding how to determine whether the rule is satisfied in a particular situation, and a variety of other types of information may similarly be stored in other embodiments and situations for such rules, such as in a manner specific to different types of rules (e.g., by storing invocation details for user-defined rules).

Figure 3:
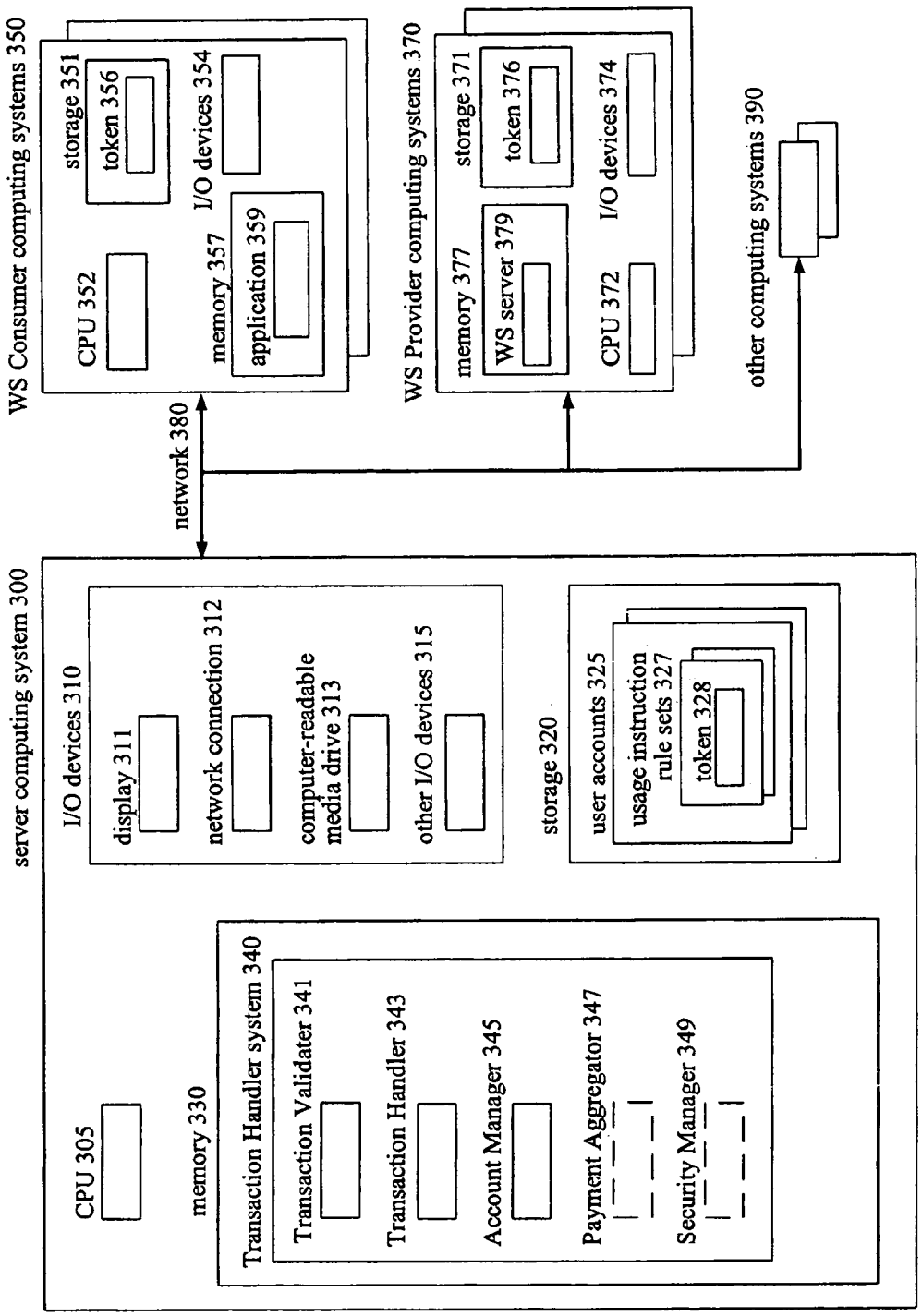
FIG. 3 is a block diagram illustrating an embodiment of a computing system suitable for executing an embodiment of the Payment Handling System.

FIG. 3 illustrates a server computing system 300 suitable for executing an embodiment of a Transaction Authorization Handler system facility 340, as well as computing systems 350 and 370 for Web services consumers and providers, respectively. The server computing system includes a CPU 305, various I/O devices 310, storage 320, and memory 330. The I/O devices include a display 311, a network connection 312, a computer-readable media drive 313, and other I/O devices 315.

An embodiment of the Transaction Authorization Handler system is executing in memory, and it includes a Transaction Validater component 341, a Transaction Handler component 343, an Account Manager component 345, an optional Payment Aggregator component 347, and an optional Security Manager component 349. In particular, the Transaction Authorization Handler system receives indications of potential transactions and determines whether to authorize the transactions. Such potential transactions may include transactions between an application program 359 executing in memory 357 of a Web service consumer system 350 and a Web service server 379 executing in memory 377 of a Web service provider system 370, and/or transactions between one or more such systems 350 and 370 and one or more other computing systems 390.

Before performing potential transactions to be authorized, users (e.g., users of the computing systems 350 and 370) interact with the Account Manager component to create user accounts, with information 325 about the user accounts stored on storage 320. Each such user can also interact with the Account Manager to create one or more usage instruction rule sets, with information 327 about each such instruction rule set stored in a manner associated with the account of the user. The Account Manager also creates a reference token for each such usage instruction rule set that is created, with information 328 about the reference token stored in a manner associated with the usage instruction rule set. After the created reference tokens are provided to users such as users of the computing system 350 and 370, those users may store reference tokens 356 and 376 on storage 351 and 371 respectively of the computing systems for later use by the application program 359 and Web service server 379, respectively. While the Account Manager component is part of the Transaction Authorization Handler system in this illustrated embodiment, in other embodiments some or all of the Account Manager component functionality could instead be performed by another system with which the Transaction Authorization Handler system interacts.

When the Transaction Authorization Handler system 340 receives an indication of a potential transaction for an authorization determination and two or more reference tokens for parties to the transaction, the Transaction Validater component retrieves stored information about the usage instruction rule sets that correspond to the reference tokens and determines whether those usage instruction rule sets are satisfied for the potential transaction under the current conditions. If so, the Transaction Handler component then assists in performing or otherwise handling the potential transaction, such as to arrange for financial payment performance between the parties for fee-based transactions.

In some embodiments, the Transaction Authorization Handler system further may include one or both of the optional Payment Aggregator component 347 and an optional Security Manager component 349. When present, the Payment Aggregator component can aggregate payments being made to and/or received from parties as appropriate, such as based on preferences of those parties and/or using other information. The Security Manager component can, when present, perform additional security-related verification of various types, such as to confirm the identity of parties to transactions, to confirm the identity and/or authorization of users supplying reference tokens, to perform user authorization for users attempting to create and/or modify user accounts and usage instruction rule sets, etc.

The functionality of the Transaction Authorization Handler system can be accessed in various ways in different embodiments. For example, some users may have physical access to the server computing system, and if so can interact with the various I/O devices 310 to provide and/or receive information. Alternatively, other users can use client computer systems to directly access the system, such as remotely via network 380 (e.g., via the Internet and/or the World Wide Web). Such users can use software or other functionality provided on the client computer systems, such as a browser (not shown) executing in memory 360, to interact with the Transaction Authorization Handler system. In other embodiments, users may instead receive functionality and/or information from the Transaction Authorization Handler system indirectly via interactions with one or more other computers, which may directly receive that functionality or information from the Transaction Authorization Handler system before providing it to the users. In addition, some or all of the Transaction Authorization Handler system components may provide various feedback or other general types of information to users (e.g., in response to user requests), and this information can be presented to the user on the display 311 of the server system or on one of the I/O devices 354 or 374 on a client system.

Those skilled in the art will appreciate that computing systems 300, 350 and 370 are merely illustrative and are not intended to limit the scope of the present invention. Computing system 300 may be connected to other devices that are not illustrated, including through one or more networks such as the Internet or via the World Wide Web ("Web"). More generally, a "client" or "server" device may comprise any combination of hardware or software that can interact, including computers, network devices, internet appliances, PDAs, wireless phones, cellphones, pagers, electronic organizers, television-based systems and various other consumer products that include inter-communication capabilities. For example, one of the computing systems 350 may be a cellphone, wireless PDA or other portable device, and a user of that phone/PDA/device may make one or more selections that result in using the capabilities of the Transaction Handler system 340, such as to handle transactions with one or more provider computing systems 370. In addition, the functionality provided by the illustrated Transaction Authorization Handler system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing device via inter-computer communication. Some or all of the Transaction Authorization Handler system components or data structures may also be stored (e.g., as instructions or structured data) on a computer-readable medium, such as a hard disk, a memory, a network, or a portable article to be read by an appropriate drive. The Transaction Authorization Handler system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

Figure 4:
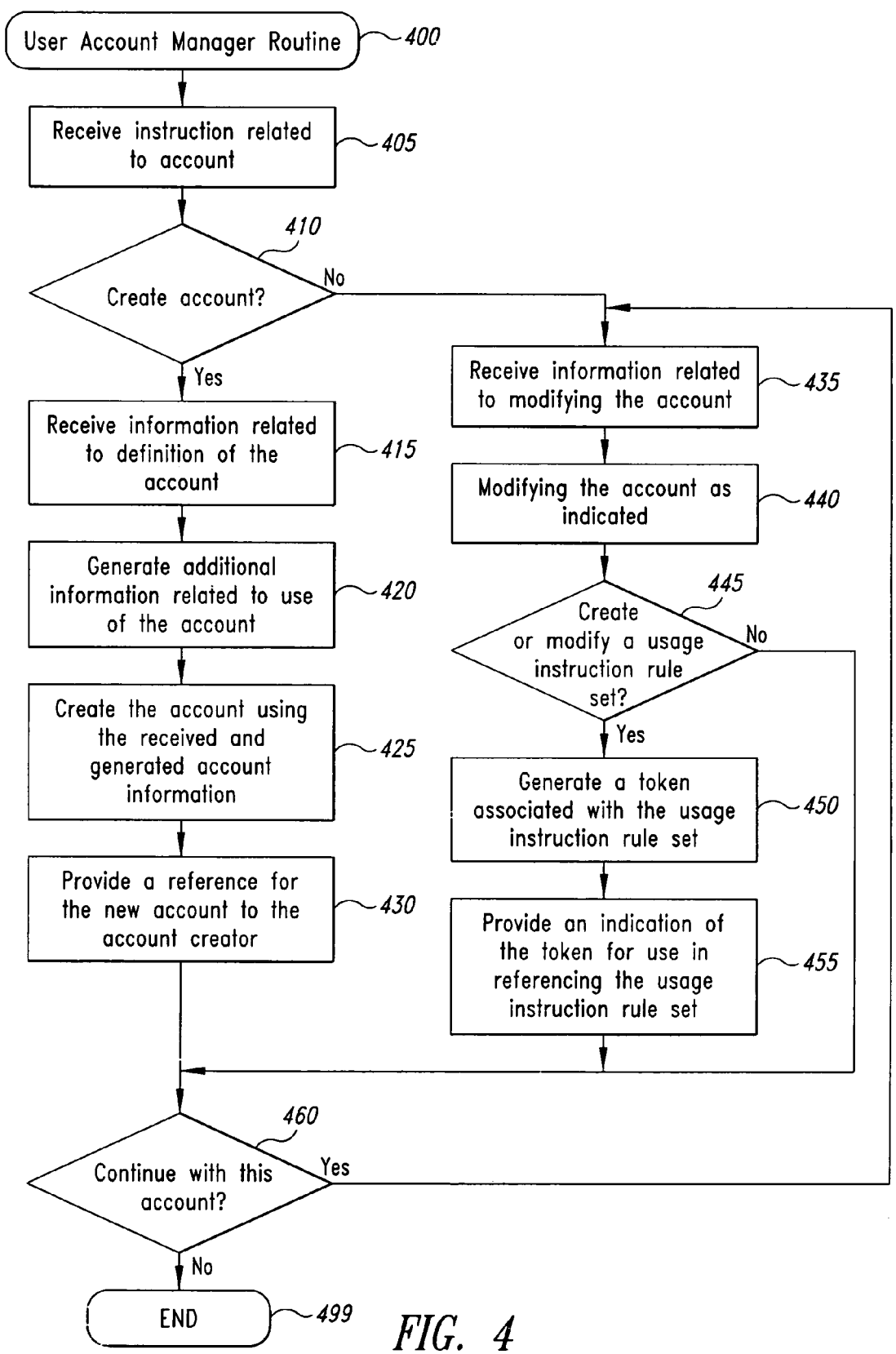
FIG. 4 is a flow diagram of an embodiment of a User Account Manager routine.

FIG. 4 is a flow diagram of an embodiment of a User Account Manager routine 400. The routine allows users to create and modify accounts for use with a transaction authorization and handler system, including defining usage instruction rule sets for use with the account. In some embodiments, the routine may be implemented as part of an interactive user interface with which a user can interact (e.g., as part of one or more Web pages of a Web site), while in other embodiments the routine may instead be executed in response to one or more programmatic invocations on behalf of users (e.g., as part of one or more Web services accessed on behalf of the users).

The routine begins at step 405, where an instruction related to an account is received. In step 410, the routine determines whether the instruction is related to creating an account, and if so continues to step 415 to receive various information related to the definition of the account. For example, in some embodiments a user may supply an account name, an account password or other security access mechanism, indications of one or more payment instruments for use with the account, indications of one or more payment repositories for use with the account, etc. The routine then continues at step 420 to automatically generate additional information related to use of the account, such as in some embodiments a unique account ID, a determination of a maximum balance allowed for a user if the account can be used as a payment instrument that can include charges, etc. In step 425, the routine then creates the account using the received and generated account information, and in step 430 provides a reference for the new account to the creator of the account (e.g., an indication of the account ID).

If it was instead determined in step 410 that the received instruction was not related to creating an account, the routine continues to step 435 to receive information related to modifying the account, and in step 440 modifies the account as indicated if appropriate. In step 445, the routine then determines whether the account modification included creating or modifying a usage instruction rule set. If so, the routine continues at step 450 to generate a unique reference token associated with the usage instruction rule set to allow later reference to the instruction rule set. At step 455, the routine then provides an indication of the reference token to the account owner for later use in referencing the usage instruction rule set. After steps 430 or 455, or if it was instead determined in step 445 that the account instruction was not related to creating or modifying a usage instruction rule set, the routine continues at step 460 to determine whether to continue making modifications to the current account. If so, the routine returns to step 435, and if not the routine continues to step 499 and ends.

While not illustrated here, in other embodiments additional functionality related to user accounts could be provided, such as to allow a user to review an account by providing information about the account. In addition, in some embodiments additional security controls may be used to ensure that a user seeking to create and/or modify an account is authorized to do so. Furthermore, in some embodiments the user accounts may be associated with a company or other entity distinct from the system providing the transaction authorization and handling capabilities.

Figure 5:
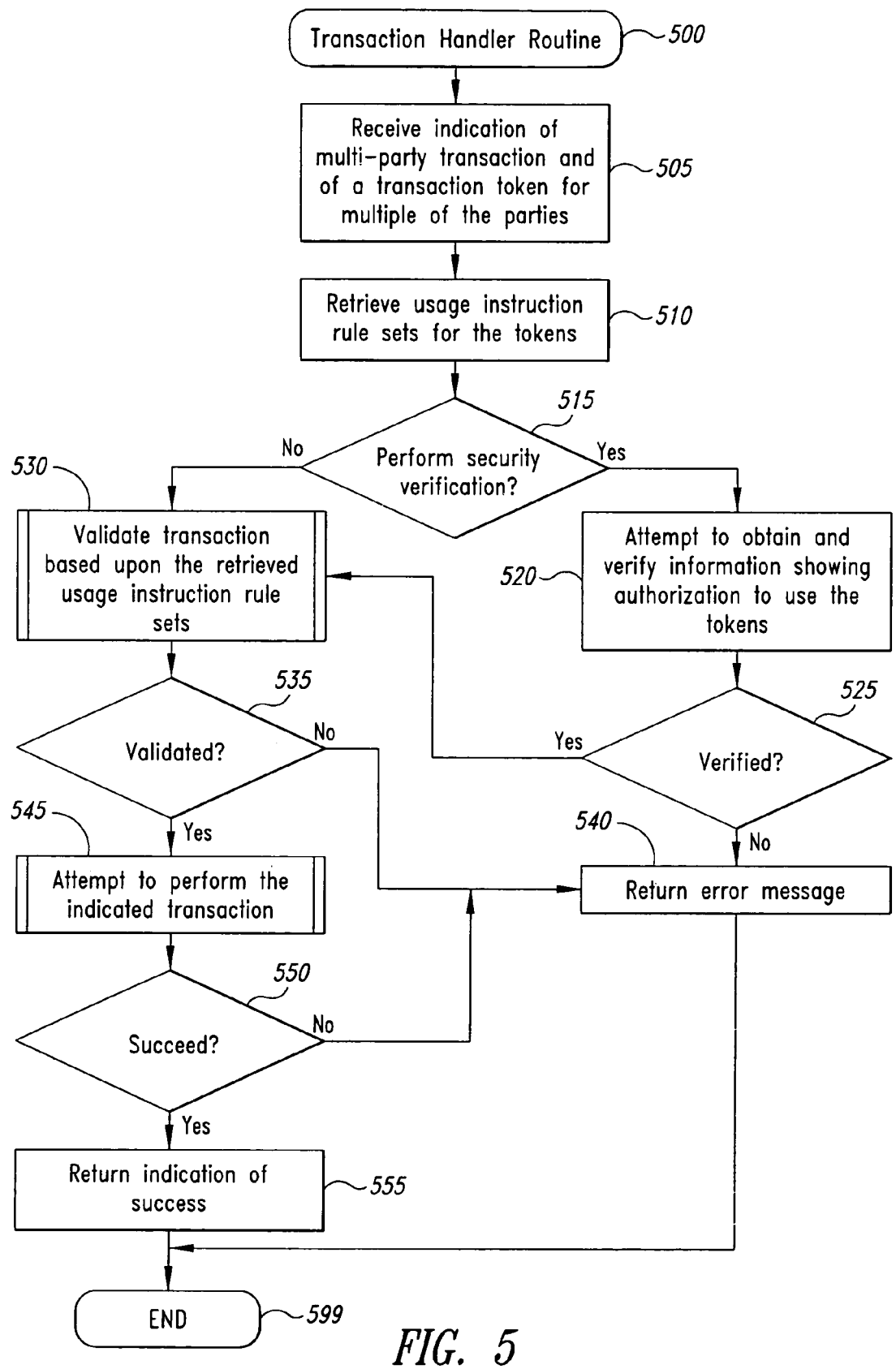
FIG. 5 is a flow diagram of an embodiment of a Transaction Authorization And Handler routine.

FIG. 5 is a flow diagram of an embodiment of a Transaction Authorization And Handler routine 500. The routine receives indications of transactions to be authorized or otherwise handled and of reference tokens corresponding to usage instruction rule sets from multiple parties to the transaction, and determines to authorize the transaction when the usage instruction rule sets are compatible. In some embodiments, the routine is invoked programmatically, such as via one or more Web services, although in other embodiments the routine could instead be invoked in other manners (e.g., interactively via a graphical user interface).

The routine begins in step 505, where an indication is received of a multi-party transaction and of reference tokens for each of multiple of the parties (e.g., one for each of the two or more parties to the transaction). The routine then continues to step 510 to retrieve the usage instruction rule sets corresponding to the tokens, and may in some embodiments further retrieve or otherwise make available other information from the user accounts to which some or all of those usage instruction rule sets belong.

The routine then continues to step 515 to determine whether to perform a security verification to determine whether the parties are allowed to use the tokens, such as based on additional security information provided by the parties. If so, the routine continues at step 520 to attempt to obtain and verify security information showing authorization of the parties to use the tokens, and in step 525 determines whether such authorization was verified. In other embodiments, such security or other access authorization to use such tokens may instead not be performed, such as when the use of the instruction rule sets for the tokens themselves will contain rules or other restrictions that control when the usage instruction rule sets are allowed to be used.

Figure 6:
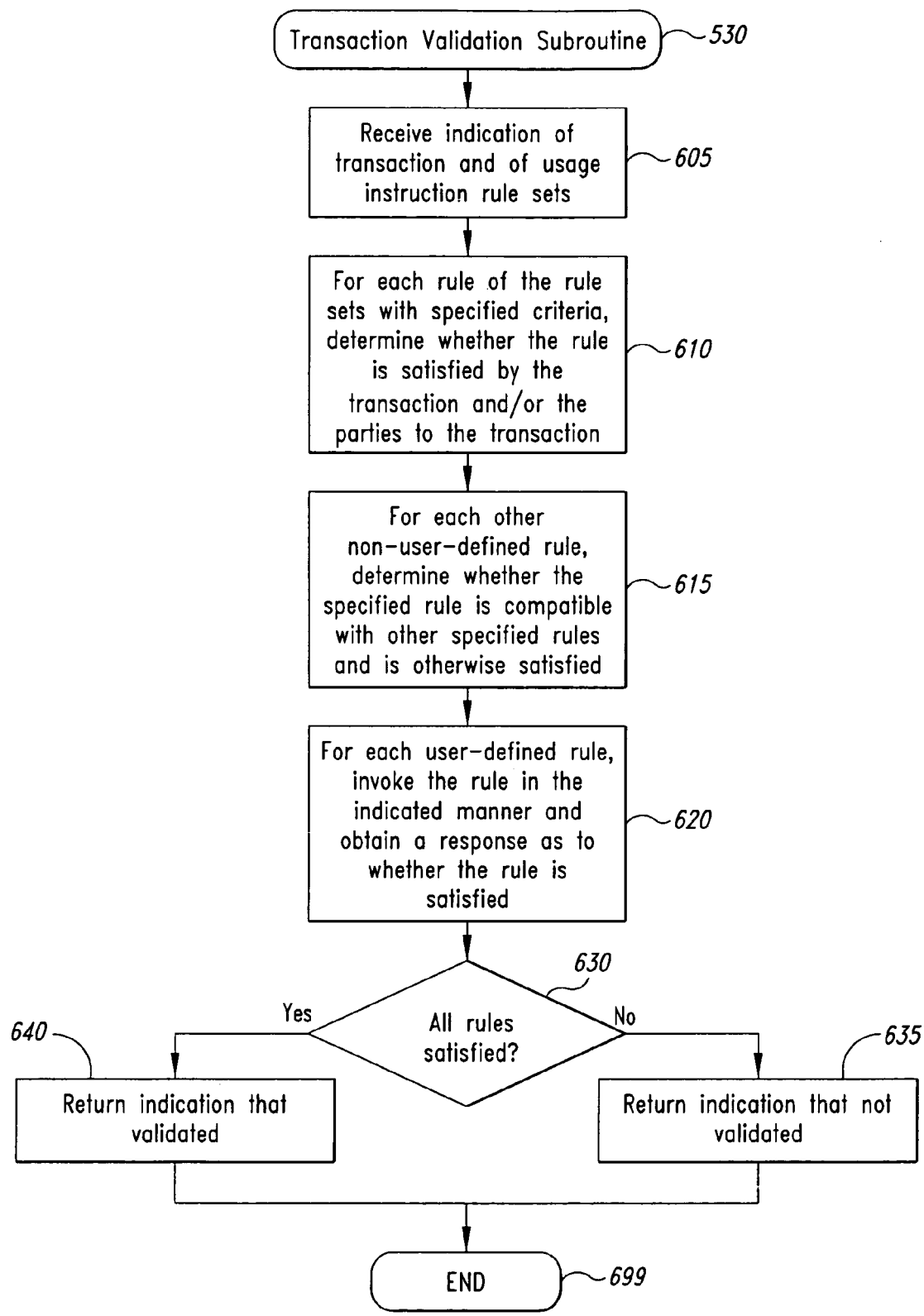
FIG. 6 is a flow diagram of an embodiment of a Transaction Validation subroutine.

If it was determined in step 525 that the token usage authorization was verified, or if it was instead determined in step 515 not to perform the security verification, the routine continues to execute subroutine 530 to validate the transaction based upon the retrieved usage instruction rule sets, as discussed in greater detail with respect to FIG. 6. If it is determined in step 535 that the transaction is validated, the routine continues to execute subroutine 545 to attempt to perform the indicated transaction (e.g., to make a financial payment for a fee-based transaction), such as in a manner specific to the type of transaction, as discussed in greater detail with respect to FIGS. 7A and 7B. In other embodiments, the routine may instead merely determine whether the transaction is authorized, leaving performance of the transaction for others.

After step 545, if it is determined in step 550 that the indicated transaction performance succeeded, the routine continues to step 555 to return an indication of success, such as in a response XML document if the routine 500 was invoked as part of a Web service. If it was instead determined in step 525 that the token usage authorization was not verified, or in step 535 that the transaction was not validated, or in step 550 that the transaction performance did not succeed, the routine continues instead to step 540 to instead return an error message, such as an XML document sent as a response if the routine was invoked as part of a Web service. After steps 540 or 555, the routine continues to step 599 and ends.

FIG. 6 is a flow diagram of an embodiment of a Transaction Validation subroutine 530. The subroutine receives an indication of a transaction and of two or more usage instruction rule sets specified by parties to the transaction, and determines whether to validate the transaction based on the rules and other information of the usage instruction rule sets.

The subroutine begins at step 605, where an indication is received of a transaction and of two or more usage instruction rule sets. In step 610, each rule that specifies criteria related to transactions with which the usage instruction rule set can be used and/or that specifies information about parties to transactions with which the usage instruction rule set can be used is selected, and information about the transaction and/or those other parties is retrieved in order to determine whether the rules are satisfied. For example, to obtain information about another party to the transaction, information from a user account associated with that other party may be obtained (e.g., the user account with which the usage instruction rule set for the token from that other party is associated), as well as information about the other parties that may be accessible in other manners (e.g., based on the invocation requests for the transaction handling routine, such as from an HTTP header used as part of a Web services invocation). Similarly, information about the transaction may be available based on information received as part of the routine invocation (e.g., as part of a transaction object or a document supplied for the transaction), or instead from an external source.

After step 610, the subroutine continues at step 615 to identify other specified rules that are not user-defined rules and that specify other terms or conditions related to allowable transaction, and determines whether any such specified rules are compatible with rules from other specified usage instruction rules sets and/or the transaction itself. The subroutine then continues at step 620 and invokes any user-defined rules in the manner specified for those rules and obtains responses indicating whether those rules are satisfied. After step 620, the subroutine continues to step 630 to determine whether all of the rules for the specified usage instruction rules sets were satisfied. If so, the subroutine continues to step 640 and returns an indication that the transaction is validated, and if not continues instead to step 635 to return an indication that the transaction is not validated. After steps 635 or 640, the subroutine continues to step 699 and ends.

In other embodiments, the transaction validation could instead be performed in other manners, such as by evaluating the various types of rules in different orders and/or stopping further rule evaluation if any rule is found to not be satisfied. Alternatively, in other embodiments, determination of whether a transaction is validated may be performed in manners other than requiring unanimous satisfaction of all specified rules, such as if usage instruction rule sets themselves specify other types of inter-relationships among the rules of those rule sets and/or based on other predefined criteria (e.g., a minimum threshold for a percentage or subset of specified rules that must be satisfied).

Figure 7A:
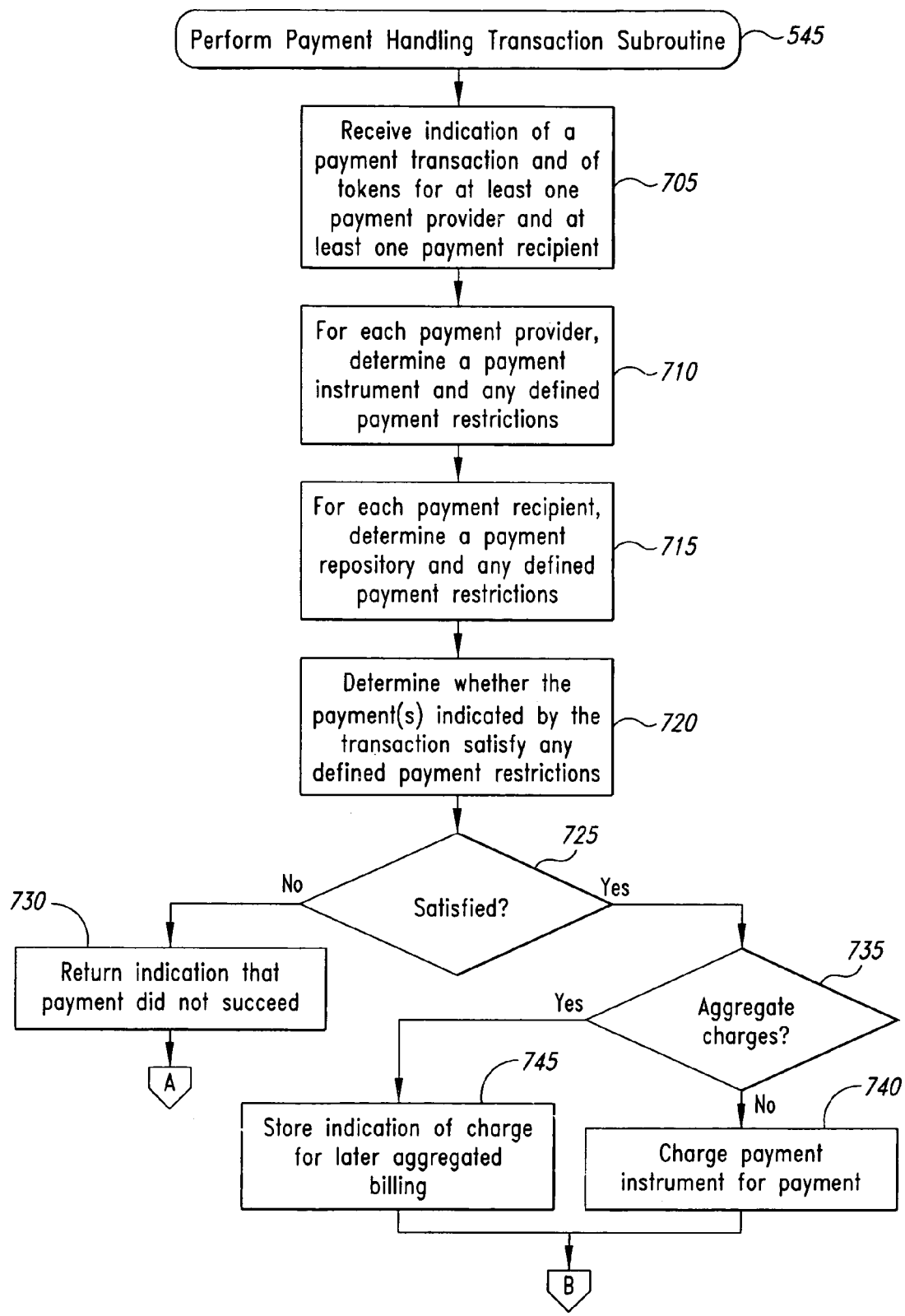
FIGS. 7A and 7B are a flow diagram of an embodiment of a Perform Payment Handling Transaction subroutine.
Figure 7B:
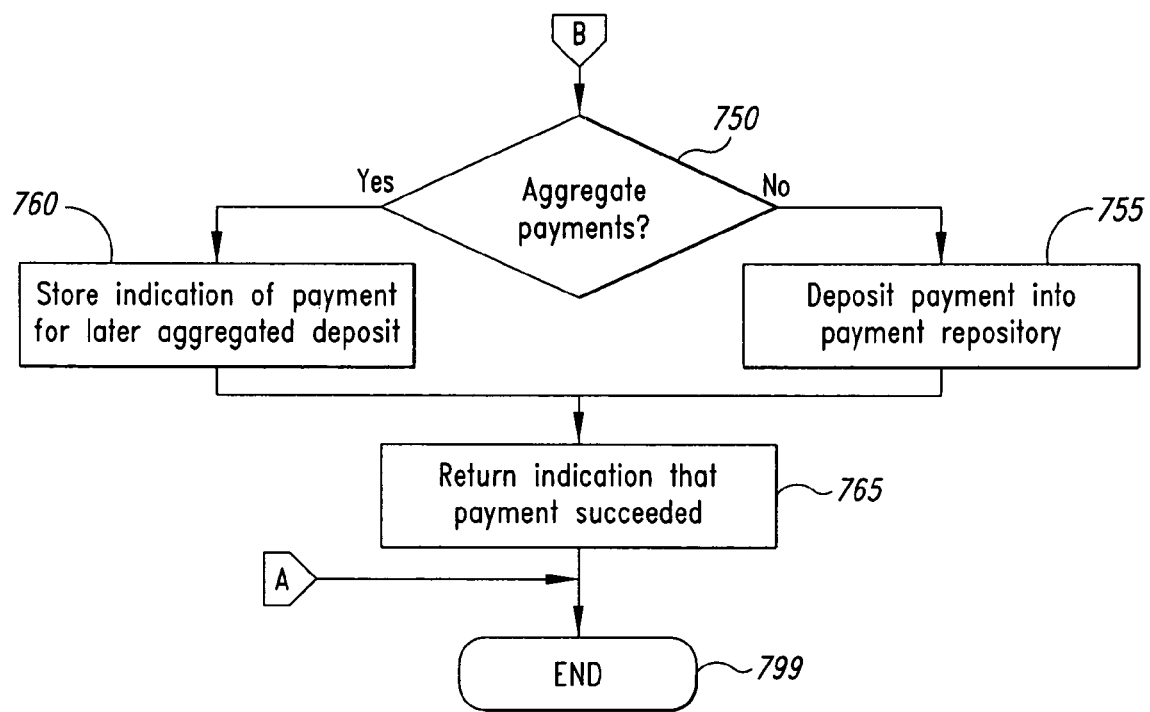

FIGS. 7A and 7B are a flow diagram of an embodiment of a Perform Payment Handling Transaction subroutine 545. This subroutine is an example of one type of handling that may be performed for some types of transactions, in this case being payment handling transactions in which at least one part to the transaction is to provide payment to at least one other party to the transaction.

The subroutine begins in step 705, where an indication is received of a payment transaction (e.g., of a payment amount and possibly of other payment-related terms) and of reference tokens for each of at least one payment provider and at least one payment recipient. In step 710, the subroutine determines for each payment provider a payment instrument to be used and any defined payment restrictions for that payment instrument, such as based on a payment instrument associated with the usage instruction rule set corresponding to the token supplied by that payment provider. Similarly, in step 715 the subroutine determines the payment repository to be used for each payment recipient as well as any defined payment restrictions. In step 720, the subroutine then determines whether the one or more payments indicated by the transaction satisfy any defined payment restrictions for the payment instruments and/or repositories, such as based on minimum or maximum current charges, minimum or maximum cumulative balances, etc.

After step 720, the subroutine continues at step 725 to determine whether the payments satisfy any defined payment restrictions, and if so continues to step 735 to, for each such payment, determine whether to bill the payment instrument for the charge separately or instead to aggregate the payment along with other payments, such as on a periodic basis (e.g., monthly) or until a minimum cumulative charge is reached. If it is determined not to aggregate the charge for a payment, the subroutine continues to step 740 to immediately charge the corresponding payment instrument for the payment, while if it is instead determined in step 735 to aggregate the charges, the subroutine continues to step 745 to store an indication of the charge for later aggregated billing for that payment instrument. While not illustrated, steps 735-745 can be repeated multiple times for each payment in the transaction if multiple payments are to occur.

After steps 740 or 745, the subroutine continues in step 750 to determine whether to deposit each payment directly in the corresponding payment repository or to instead aggregate the payment along with other payments before depositing the aggregate payments. If it is determined not to aggregate the payments, the subroutine continues to step 755 to immediately deposit each such payment into the appropriate payment repository, while if it is instead determined in step 750 to aggregate a payment the subroutine continues instead to step 760 to store an indication of the payment for later aggregated deposit into the appropriate payment repository. While not illustrated here, steps 750-760 can be performed for each payment to be made for a transaction.

After steps 755 or 760, the subroutine continues to step 765 to return an indication that the payment succeeded. If it was instead determined in step 725 that the payments indicated by the transaction did not satisfy one or more defined payment restrictions, the subroutine continues instead to step 730 to return an indication that the payment did not succeed. In some embodiments, the ability to aggregate payments and/or deposits is considered when determining whether any defined payment restrictions are satisfied, such as to allow multiple payments or deposits to satisfy minimum amount restrictions, while in other embodiments each such payment is individually considered. Alternatively, in other embodiments the payment deposit aggregation and/or payment charge aggregation may not be performed. After steps 730 or 765, the subroutine continues to step 799 and ends.

Those skilled in the art will also appreciate that in some embodiments the functionality provided by the routines discussed above may be provided in alternative ways, such as being split among more routines or consolidated into less routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

The following provides illustrative examples of techniques for defining and using usage instruction rule sets and rules for the instruction rule sets, although the invention is not intended to be limited to these details.

An example of limiting a transaction to a particular payment sender or recipient is as follows:

Allowed Recipient Token
recipientToken=='token1';
If the recipient's token exactly matches token1 the transaction will be allowed. This rule is available to all parties (sender, recipient, caller). Examples of specifying multiple allowed recipient tokens include the following:
RecipientToken in ('token1', 'token2', 'token3');
or, in an alternative embodiment,
recipientToken=='token1' or recipientToken =='token2' or recipientToken=='token3';

Blocked Sender Token
senderToken!='token1';
The transaction will be disallowed if the sender's token matches token1. This rule is available to all parties (sender, recipient, caller). Examples of specifying multiple blocked senders include the following:
SenderToken notIn ('token1', 'token2', 'token3');
or, in an alternative embodiment, senderToken!='token1' and senderToken!='token2' and senderToken!='token3';

An example of creating a secret handshake is as follows:

This is an example of the sender and recipient exchanging a secret handshake to agree on some term. If both parties do not have rules like this defined, then the transaction will be disallowed.

Sender Secret
string SharedSecretSender:='rumplestilskin';
SharedSecretSender==SharedSecretRecipient;

For the secret handshake rule, if the sender and recipient do not define the same value, the transaction will be disallowed. Any string can be used in place of 'rumplestilskin', and any reference name can be used in place of SharedSecretSender and SharedSecretRecipient, as long as it is not a predefined reference.

Recipient Secret
string SharedSecretRecipient:='rumplestilskin';
SharedSecretSender==SharedSecretRecipient;

For the secret handshake rule, if the sender and recipient do not define the same value, the transaction will be disallowed. Any string can be used in place of 'rumplestilskin', and any reference name can be used in place of SharedSecretSender and SharedSecretRecipient, as long as it is not a predefined reference.

An example of creating a limited-use reference token is as follows:

Payment instruction rule sets can limit the number of times a token can be used to make a payment, the total amount that the token is used for, or the expiration date of a token. These rules apply only to the usage of that token, so a sender's payment instruction rule set can only limit the usage of the sender's token. Likewise, the same applies for the caller and recipient.

Single Use Token
MyTokenUseCount<=1;
or, in an alternative embodiment,
tokenTransactionCount==1;

This rule causes the token to stop working after it has been used once. It applies only to its own payment instruction rule set, so a sender's instruction set can only limit the usage.

Limit Number of Times Used
MyTokenUseCount<=5;
or, in an alternative embodiment,
tokenTransactionCount<=5;

This rule causes the token to stop working after it has been used 5 times.

Limit Total Amount
MyTokenUseTotalAmount<='USD 50';
or, in an alternative embodiment,
tokenTransactionAmount<=$50;

This rule limits the total amount this token is used for to USD 50.

Expiration Date
TransactionTimestamp<'Jan. 30, 2005';
or, in an alternative embodiment,
transactionRequestDate<dateTime 'Jan. 30, 2005';

This rule causes the token to stop working on Jan. 30, 2005. From midnight on this date (00:00 GMT) and onwards, all transactions using this token are disallowed.

Use Only as Recipient
MyRole=='recipient';

This rule causes the token to disallow payment unless this token is used as the recipient's token.

Use Only as Caller
MyRole=='caller';

This rule causes the token to disallow payment unless this token is used as the caller's token.

Use Only as Recipient
MyRole=='sender';

This rule causes the token to disallow payment unless this token is used as the sender's token.

An example of limiting the amounts of a transaction is as follows:

Transaction amount limit rules are available to all parties.

Maximum Transaction Amount
transactionAmount<='USD 50';

This rule limits the transaction amount to USD 50 or less. If the transaction is greater than this amount, this rule will disallow the transaction.

Minimum Transaction Amount
transactionAmount>='USD 1';

This rule limits the transaction amount to USD 1 or greater. If the transaction is less than this amount, this rule will disallow the transaction.

Limit Transaction Currency
getCurrency(transactionAmount)=='JPY';

This rule limits the transaction currency to Japanese Yen. If the transaction currency is not Japanese Yen, then the transaction will be disallowed.

An example of a payment provider/sender specifying payment details is as follows:

The sender specifies the payment method, such as whether the payment is being made from a credit card, an ACH bank account, or from an existing account balance.

Balance Transfer
string paymentMethod:='balance transfer';

This rule specifies that funds will be taken from an existing account balance.

Default ACH Bank Account
string paymentMethod:='ach';

This rule specifies that a default ACH bank account for the account will be used. The default ACH account can be specified in various ways, such as via CrateAccount or SetDefaultFinancialInstrument messages.

Specific ACH Bank Account
string paymentMethod:='ach';
string paymentInstrument:='financialInstrumentReference';

This rule specifies a specific ACH bank account referred to by financialInstrumentReference. A financial instrument reference is returned from the installACHBankAccount message. In this example, a financial instrument reference is not a bank account number, which in some embodiments may not be included in payment instruction rule sets for privacy reasons. The PaymentMethod should be specified to allow assertions to be made against it in other payment instruction rule sets.

Default Credit Card
string paymentMethod:='credit card';

This rule specifies that the default credit card for the account will be used. The default credit card can be specified in various ways, such as via CrateAccount or SetDefaultFinancialInstrument messages.

Specific Credit Card
string paymentMethod:='credit card';
string paymentInstrument:='financialInstrumentReference';

This rule specifies a specific credit card bank account referred to by financialInsrtrumentReference. A payment instrument reference is returned from the installCreditCard message. In this example, a financial instrument reference is not a credit card number, which in some embodiments may not be included in payment instruction rule sets for privacy reasons. The PaymentMethod should be specified to allow assertions to be made against it in other payment instruction rule sets.

An example of a payment recipient specifying dispute resolution policies is as follows:

Dispute Resolution may happen when the sender registers a dispute about a particular transaction. If specified by the recipient's payment instruction rule set, an automatic refund will be issued from the recipient to the sender to resolve the dispute. A dispute is initiated by the sender, and is governed by the dispute resolution policies specified by the recipient. In this example embodiment, ordinary refunds are not disputes and can be requested by the recipient at any time, and will always succeed, regardless of the dispute resolution policies specified by these rules.

'Sender Wins' Time Limit
duration SenderWinsTimeLimit:='15 days';
or, in alternative embodiments,
senderWinsTimeLimit:=duration 'P15D';

This rule specifies that if the sender registers a dispute within 15 days of the transaction, an automatic refund will be issued.

No Automatic Refund
duration SenderWinsTimeLimit:='0 days';
or, in an alternative embodiment,
senderWinsTimeLimit:=duration 'P0D';

This rule specifies that there will be no automatic refund issued if the sender registers a dispute.

'Sender Wins' Refund Fraction or Percentage Limit
number SenderWinsRefundFraction:=50%;
or, in an alternative embodiment,
senderWinsPercentLimit:=50%;

This rule specifies only 50 percent of the transaction amount will be refunded to resolve a dispute.

An example of a caller/end-user or payment recipient limiting the payment method is as follows:

The caller and/or recipient can place limits on where the funds come from. For example, if the caller is paying for the transaction fees, the caller might wish to make sure that the source of funds is not a 'credit card', since credit cards transaction fees are higher than other methods.

Balance Transfers Only
paymentMethod=='balance transfer';

This rule will disallow the transaction if the payment method is not a balance transfer.

Balance Transfers and ACH Only
paymentMethod=='balance transfer' or paymentMethod=='ach';

This rule will disallow the transaction if the payment method is not a balance transfer or ACH.

No Credit Cards
paymentMethod!='credit card';

This rule will disallow the transaction if the payment method is a credit card.

An example of limiting the fraction of a fee paid is as follows:

Fee percentages are passed into the Pay message by the caller. Any party can use these rules.

Limit Sender's Fraction of the Total Fee
SenderFractionOfFee<=50%;
or, in an alternative embodiment,
senderFeePercent<=50%;

This rule will disallow the transaction if the sender is paying more than 50% of the total fees paid.

Limit Recipient's Fraction of the Total Fee
RecipientFractionOfFee<=80%;
or, in an alternative embodiment,
recipientFeePercent<=80%;

This rule will disallow the transaction if the recipient is paying more than 80% of the total fees paid.

Limit Caller's Fraction of the Total Fee
CallerFractionOfFee<=⅓;
or, in an alternative embodiment,
callerFeePercent<=⅓;

This rule will disallow the transaction if the recipient is paying more than ⅓ of the total fees paid.

Examples of context data available for payment instruction rule sets and that can be sent as an XML document as part of a pay request message (e.g., from a caller to the transaction authorizer) are as follows:

| Parameter | Value Type | Description |
|---|---|---|
| callerCredential | string | Created and authenticated by a credential service to validate the caller's identity |
| senderToken | string | Identifies the sender's payment instruction rule set in their account |
| recipientToken | string | Identifies the recipient's payment instruction rule set in their account |
| callerToken | string | Identifies the caller's payment instructioqn rule set in their account |
| senderFractionOfFees | number | The fraction of the fee amount that will be paid by the sender |
| recipientFractionOfFees | number | The fraction of the fee amount that will be paid by the recipient |
| callerFractionOfFees | number | The fraction of the fee amount that will be paid by the caller |
| transactionAmount | money | The amount of the payment between sender and recipient |
| SenderTxnReference | string | A description of the transaction that is meaningful to the sender - in some situations this may be optional |
| RecipientTxnReference | string | A description of the transaction that is meaningful to the recipient - in some situations this may be optional |
| CallerTxnReference | string | A description of the transaction that is meaningful to the caller - in some situations this may be optional |
| ServiceDescription | string | Description of the service or product being provided (for which payment is being made) - in some situations this may be optional |

Examples of context data available for tokens are as follows:

| Parameter | Value Type | Description |
|---|---|---|
| tokenTransactionCount | number | The number of transactions approved by this token, including the current transaction. |

-continued

| Parameter | Value Type | Description |
|---|---|---|
| tokenTransactionAmount | money | The total amount of all transactions approved by this token, including the current transaction. |

An example of using payment instruction rule sets to authorize a payment for a transaction is as follows:

In this example, the transaction includes a caller party requesting a Web service from a recipient party using an application program provided by a sender party. The caller is paying for the fees associated with the requested service that are charged by the transaction authorizer, the sender is paying for the cost of the transaction, and the transaction amount is USD $50.00. The values of the parameters passed in as part of the transaction authorization call to a third-party transaction authorizer are:

CallerFractionOfFees:=100%
    SenderFractionOfFees:=0%
    RecipientFractionOfFees:=0%
    TransactionAmount:=USD 50.00

Any optional parameters are saved with the transaction, but don't affect the execution of the transaction.

Data Retrieval and Account Verification

The transaction authorizer receives the transaction authorization call from the caller, which includes tokens for the caller, recipient and sender, and retrieves data associated with the tokens. The data retrieved is the following:

Account Information for each of the parties, as identified by the corresponding Token:
        Account ID
        Status (Active, Closed, Suspended)
        Balance
        Available Balance The transaction authorizer verifies that the accounts for the various parties exist and are all active. If any of the accounts are inactive, then the transaction is disallowed and an error is returned. Otherwise, the transaction authorizer continues to retrieve data associated with the payment instruction rule sets:

Payment Instruction Rule Sets and Statistics for each of the parties, by Token:
    Payment Instruction Rules
    Usage Total Count: number of transactions allowed by the token so far
    Usage Total Amount: sum of transaction amounts (absolute value) allowed by the token so far
    The transaction authorizer's own Payment Instruction Rules, for specifying fees, defaults, and allowed values.

The instruction sets are shown below for each of the token roles, and are then described.

Sender:
limit to $50 per transaction
TransactionAmount<='USD 50';
limit token usage to 10 and $75 total, whichever comes first
TokenTransactionCount<=10;
TokenTransactionAmount<='USD 75';
token expires on Jun. 1, 2004
TransactionDate<='2004-Jun. -1,';
refuse to pay any fees
SenderFractionOfFees==0%;
withdraw funds from the sender's default ACH account
string PaymentMethod:='ach';
dispute resolution: recipient must allow dispute refunds for 10 days or more, at 90% or more
SenderWinsTimeLimit>='10 days';
SenderWinsFractionLimit>=90%;

Recipient:
token expires on Oct. 1, 2004
TransactionDate<='2004-Oct. -1,';
caller must pay all fees
callerFractionOfFees==100%;
dispute resolution: allow dispute refunds for 10 days or more, at 100%
duration SenderWinsTimeLimit:='10 days';
number SenderWinsFractionLimit:=100%;

Caller:
fail if the payment method is not ACH or balance transfer
PaymentMethod in ('ach', 'balance transfer');

The Transaction Authorizer:
fail if the payment method is not ACH, balance transfer, or credit card
PaymentMethod in ('ach', 'balance transfer', 'credit card');

The transaction authorizer merges the retrieved data with the data received in the pay request message in the authorization call, and evaluates the payment instruction rule sets of the various parties.

Evaluate Payment Instruction Rule Sets

The following discusses the evaluation, showing the interaction between the various payment instruction rules. The payment instruction rule sets presented here all agree.

Sender:
limit to $50 per transaction
TransactionAmount<='USD 50';
The sender is limiting the amount of each transaction to $50. This does not limit the total usage of the token (see next item).

Sender:
limit token usage to 10 uses total
MyTokenUseCount<=10;
limit token usage to $75 total
MyTokenTotalAmount<='USD 75';
The sender is limiting the usage of the token to 10 uses or $75 total, whichever comes first.

Sender:
token expires on Jun. 1, 2004
TransactionDate<='2004-Jun. -1,';

Recipient:
token expires on Oct. 1, 2004
TransactionDate<='2004-Oct. -1,';
The sender's token can only be used until Jun. 1, 2004, while the recipient's token can be used until Oct. 1, 2004.

Sender:
refuse to pay any fees
senderFractionOfFees==0%;

Recipient:
caller must pay all fees
callerFractionOfFees==100%;
The sender asserts that she will not pay any fees. The recipient has a more stringent requirement, that the caller is paying all fees.

Sender:
withdraw funds from the sender's default ACH account
PaymentMethod:='ach';

Caller:
fail if the payment method is not ACH or balance transfer
PaymentMethod in ('ach', 'balance transfer');

The Transaction Authorizer:
fail if the payment method is not ACH, balance transfer, or credit card
PaymentMethod in ('ach', 'balance transfer', 'credit card');

The sender is setting the payment method to be ACH, which means that funds will be withdrawn from the default ACH bank account associated with the sender's Account with the transaction authorizer. Since the caller is paying 100% of the fees, the caller makes an assertion that the payment method must be either ACH or a balance transfer, to keep her costs down. The transaction authorizer's payment instruction rule set makes sure that the PaymentMethod is set, and restricts its values.

Recipient:
allow dispute refunds for 10 days after the transaction date
duration SenderWinsTimeLimit:='10 days';
allow dispute refunds at 100%
number SenderWinsFractionLimit:=100%;

Sender:
recipient must allow dispute refunds for 10 days or more
SenderWinsTimeLimit>='10 days';
recipient must allow dispute refunds at 90% or more
SenderWinsRefundFraction>=90%;

The recipient specifies a dispute resolution policy that allows the sender to receive a 100% refund for up to ten days after the transaction date. The sender refuses to pay unless the recipient specifies a dispute resolution policy that she agrees to: 90% or more refunds for at least 10 days after the transaction date. The sender and recipient are in agreement.

Execute Transaction

From the evaluation of the payment instruction rule sets, the following variables are known:
PaymentMethod:='ach'
SenderWinsTimeLimit:=10 days
SenderWinstFractionLimit:=100%

The transaction authorizer looks up the default ACH financial instrument for the sender to use as the source of funds for the primary transaction. According to the fee schedule, ACH transactions cost $0.60 for the $50 transaction (1.0%+$0.10 per transaction). The transaction authorizer also generates a Transaction ID that will be returned to the caller. Based on all this, the transaction authorizer executes the following:
  withdraws $50.00 from the sender's bank account via ACH
  deposits $50.00 in the sender's account at the transaction authorizer
  performs a balance transfer from the sender's transaction authorizer account to the recipient's account at the transaction authorizer for $50.00
  performs a balance transfer from the caller's account at the transaction authorizer to the transaction authorizer for $0.60

The references and descriptions, along with the dispute resolution variables, are all stored in the transaction data. Account balances are updated in the course of executing the above transaction.

Pay Response Message
Since the transaction was successful, a Transaction ID is returned to the caller as part of a pay response message.

| Parameter | Type | Description |
| --- | --- | --- |
| TransactionID | String | A reference to the transaction that can be supplied back to the transaction authorizer for queries, refunds, disputes and other operations. |

In some embodiments, usage instruction rule sets are used to check to see if some event is to be authorized or not, and include a set of rules (also referred to as "assertion expressions" or "assertions") that are evaluated against context data—if the rules/assertions evaluate to true for a given set of context data, then the event is authorized. An example of a language for defining usage instruction rule sets is as follows:

ASSERTION EXAMPLES

In this example language, assertions are expressions that evaluate to true or false (i.e., are boolean expressions). Assignments can also be used to set the value of a variable. If all of the assertions in an instruction rule set evaluate true, then a transaction is allowed, and if so the values of variables as assigned (if any) may be used to direct the execution of the transaction.

The simplest payment instruction rule set consists of the following text, as it will always evaluate to true: true;

Let's add more assertions with logical operators, some simple expressions and literals. Here's what it looks like now:
not false or false and true;
12.3>=7;
('Dec. 5, 2004' >=now)!=(TransactionAmount * 2 <='USD 4.10');

The above payment instruction rule sets will always evaluate to true (as long as it's before Dec. 5, 2004).

Expressions in this example language are similar to those in Perl or C with respect to operator precedence. To illustrate, look at the following expression:

5+5*10==55;

The above evaluates to true, because it is equivalent to:

(5+(5*10))==100;

More generally, the precedence of operator evaluation is in the following order:
1) Literals, blackboard dereferences, and expressions in parentheses ( )
2) negate–not!
3) times * div/, left to right
4) minus–plus+, left to right
5) equals==notEquals!=lessThan<greaterThan>lessThanOr Equals<=greaterThanOr Equals>=,in,notIn
6) and &&,left to right
7) or ||,left to right Also like C or Perl, white space is ignored in this example language, so tabs, spaces and newlines are not significant (except within string quotes, where exact formatting is preserved).

ASSIGNMENT EXAMPLES

You can create variables and set their values by making assignment statements. An assignment statement looks like this:

type Name:=expression;

The following statement creates a variable, of money type, called MyFavoriteAmount, and sets the value to USD 7.99:

money MyFavoriteAmount:='USD 7.99';

Variables do not change value throughout the evaluation of a payment instruction rule set. There can be multiple assignment statements for a variable (even in different payment instruction rule sets), but the values all have to agree, or it will be treated as an assertion failure. Variables are stored in the blackboard, which means that you can dereference them in assertions. Variables assigned in a payment instruction rule set (or another payment instruction rule set evaluated at the same time) can be used in any expression.

Context Blackboard

Doing expressions with literals is fairly useless, since they always evaluate to the same result. In practice, payment instruction rule sets are evaluated against some set of context data, which in this example language are stored in a memory area called a blackboard. In this example, a blackboard is a simple map of string keys to scalar values. The string keys typically start with a capital letter. The names are case-sensitive. The blackboard provides data that is specific to an event.

To dereference blackboard data in an expression, the reference name is simply included in an expression:

TransactionAmount/2>='USD 5.00';

Blackboard dereferences can be used in any expression where a scalar value could go.

Variables stored in the blackboard are either global or private. Private variables can be used only by a specific payment instruction rule set (e.g., a sender, recipient or caller), while global variables can be used in expressions by any of the payment instruction rule sets.

In this example, variables are assigned a single value which does not change. Different variables have different sources for their value. For example, some variables are assigned their value within a payment instruction rule set, some are specified by the transaction authorization system ("TAS"), and some are passed in by a caller in a pay request message.

The chart below indicates variables that are defined for every pay request message, along with the source of each variable's value. In addition, payment instruction rule sets can create their own variables using assignment statements. These variables are global; for example, a variable created by an assignment statement in the sender's payment instruction rule set can be used in an expression in the recipient's instruction. User-specified variable names should start with an identifying sequence of characters specific to the user to avoid colliding with TAS-defined variable names and other user-defined variables. For example, variable names defined by Bob's Surf Shack could all start with 'BobsSurfShack'.

With a few exceptions, all global variables can either be passed in by a caller in a pay request message, or can be specified in any of the payment instruction rule sets—thus, current sources shown in the chart below are a convention only. Exceptions to this include variables with values specified by TAS, and the fact that at least one token has to be passed into the incoming authorization message, and any other tokens to be used have to be reachable. For example, if the CallerToken is the only token provided in a pay request message, then the corresponding payment instruction rule set could indicate the SenderToken or the RecipientToken or both. If it only indicates the SenderToken, then the sender's payment instruction rule set could indicate the RecipientToken, and vice versa.

Global Variables

| Variable Name | Source | Type | Description |
| --- | --- | --- | --- |
| TransactionTimestamp | specified by TAS | datetime | The date and time of the transaction |
| TransactionID | specified by TAS | string | The ID of the transaction |
| TotalFeeAmount | specified by TAS | money | The total amount of the fee paid to TAS for this transaction. |
| SenderFractionOfFees | passed in by caller in pay request message | number | The fraction of the TAS fees that the sender will pay. Value must be between 0 and 1 |
| RecipientFractionOfFees | passed in by caller in pay request message | number | The fraction of the TAS fees that the recipient will pay, with a value between 0 and 1 |
| CallerFractionOfFees | passed in by caller in pay request message | number | The fraction of the TAS fees that the caller will pay, with a value between 0 and 1 |
| TransactionAmount | passed in by caller in pay request message | money | The amount of the transaction |
| TransactionDescription | passed in by caller in pay request message | string | A human readable description of what's being purchased. Stored with the transaction and used when displaying the transaction for reporting and auditing |
| TransactionData | passed in by caller in pay request message | string | Data provided by the caller regarding this transaction. For example, the caller could store an XML description of the service being sold. This data is stored with the transaction but it is opaque to TAS |
| SenderToken | passed in by caller in pay request message | string | Token referring to sender's payment instruction rule set |
| RecipientToken | passed in by caller in pay request message | string | Token referring to recipient's payment instruction rule set |

| Variable Name | Source | Type | Description |
| --- | --- | --- | --- |
| CallerToken | passed in by caller in pay request message | string | Token referring to caller's payment instruction rule set |
| PaymentMethod | specified by sender's payment instruction rule set | string | Specifies the type of financial instrument used as the source of funds. one of: ACH, credit card, account transfer |
| PaymentInstrument | specified by sender's payment instruction rule set | string | Specifies the reference of the financial instrument used as the source of funds |
| SenderWinsTimeLimit | specified by recipient's payment instruction rule set | duration | Specifies the maximum time after the TransactionTimestamp a sender can automatically obtain a refund by registering a dispute. The amount of the refund is limited by SenderWinsRefundFraction |
| SenderWinsRefundFraction | specified by recipient's payment instruction rule set | number | Specifies for what fraction of the TransactionAmount a sender can automatically obtain a refund by registering a dispute. The dispute must be registered within the time specified by SenderWinsTimeLimit. |

Private Variables

The private variables listed in the chart below are provided for each payment instruction rule set such that each payment instruction rule set gets its own copy of each of these variables. For example, the data in these references are different for the sender than for the recipient. The recipient can not access the sender's values and vice versa.

| Variable Name | Source | Type | Description |
| --- | --- | --- | --- |
| MyTokenUseCount | specified by TAS | number | The number of transactions approved by this token, optimistically including the current transaction |
| MyTokenUseTotalAmount | specified by TAS | money | The total amount of all transactions approved by this token, optimistically including the current transaction |
| MyFeeAmount | specified by TAS | money | The amount of the fee paid by this payment instruction rule set. For example, for the caller's instruction, this is equal to CallerFractionOfFees times TotalFeeAmount |
| MyRole | specified by TAS | string | The role of the party for which this token is being used in the transaction. One of: sender, recipient, caller |
| MyTokenID | specified in payment instruction rule set or passed in to install payment instruction rule set message | string | a user-meaningful ID for the payment instruction rule set |
| MyTokenDescription | specified in payment instruction rule set or passed in to install payment instruction rule set message | string | a user-meaningful human-readable description of the payment instruction rule set |
| MyTokenData | specified in payment instruction rule set or passed in to install payment instruction rule set message | string | user-meaningful machine-readable data related to the payment instruction rule set |
| MyTransactionID | sender, recipient and caller values each passed in by caller in pay request message | string | An ID for the transaction that is meaningful only to the sender, recipient or caller. Stored with the transaction |
| MyTransactionDescription | sender, recipient and caller values each passed in by | string | A human readable description of what's being purchased that is meaningful only to the sender, recipient or caller. Stored with the transaction. |

| Variable Name | Source | Type | Description |
|---|---|---|---|
| MyTransactionData | caller in pay request message sender, recipient and caller values each passed in by caller in pay request message | string | Data provided by the caller regarding this transaction that is meaningful only to the sender, recipient or caller. For example, the recipient could store an XML description of the service being sold. This data is stored with the transaction but it is opaque to TAS |

Comments

Comments start with the pound sign (#) and cause the rest of the line to be ignored. For multi-line comments, put a # at the start of each line.
this is a comment that
spans more than one line Language Characteristics While in some embodiments the language may include temporal aspects such as looping constructs and/or recursion, in this example there are no such temporal aspects or branching statements. Data types include boolean, number, string, datetime, duration, and money. Operators are as follows:

| | |
|---|---|
| == | equals: true if the left and right sides are equal |
| != | notEquals: true if the left and right sides are not equal |
| < | lessThan |
| > | greaterThan |
| <= | lessThanOrEquals |
| >= | greaterThanOrEquals |
| <= | lessThanOrEquals |
| := | assignment: assigns the left hand side to the value of the right hand side |
| + | addition |
| - | unary negate or subtraction |
| * | multiply |
| / | divide |
| && | and |
| \|\| | or |
| ! | not |

Literals

Boolean
true
false

Number
123
0.234
5%

Any integer is allowed, up to $2^{31}-1$. Negative values are achieved via the 'negate' operation. Decimal numbers are also supported, and are not stored as floating-point numbers. Numbers start with a digit, so a leading zero is used for decimal numbers between zero and one. Expressing a number as a percentage is also supported.

String
'any text'

String literals are enclosed in single quotes. Double quotes are not currently used.

Datetime
now
'YYYY-MON-DD'
'YYYY-MON-DD HH:MM:SS AM'

The 'now' literal returns the current time. The quoted text that follows this pattern can be compared with. The datetime keyword works with quoted strings, not string expressions.

Duration
'10 days'

The duration literal specifies a period of time, and can be added to dates to form new dates. A variety of math operations are available.

'1 year 2 months 3 days 10 hours 30 minutes'
'P1Y2M3DT10H30M'

The above 2 literals styles are both supported. The second one translates to 1 year, 2 months, 3 days, 10 hours, and 30 minutes. The second form of the duration literal follows the definition of the duration from the W3C XML Schema Specification. From http://www.w3.org/TR/xmlschema-2/#duration:

The lexical representation for duration is the [ISO 8601] extended format PnYn MnDTnH nMnS, where nY represents the number of years, nM the number of months, nD the number of days, 'T' is the date/time separator, nH the number of hours, nM the number of minutes and nS the number of seconds.

Money
'USD 1.00'
money ('USD', TokenTransactionCount* 0.05)

Money literals can be specified by a currency code and a number literal, or a currency code and an expression returning a number. See http://www.bsi-global.com/iso4217currency for more information on currency codes, including a table listing all currency codes. The set of allowable currency codes is not limited to those specified by ISO 4217, but ISO 4217 currency codes will be recognized.

Operations and Built-In Functions

In the following section, lhs and rhs stand for the left-hand-side operand and the right-hand-side operand, respectively.

NegateOperation
-rhs
negate rhs
   allowed types: integer, double, duration, money
NotOperation
! rhs
not rhs
   allowed types: boolean OrOperation
lhs or rhs
lhs || rhs
   allowed types: boolean AndOperation
lhs and rhs
lhs && rhs
   allowed types: boolean InOperation
lhs in (rhs1, rhs2, rhs3 . . . )
   allowed types: all types
   lhs and rhs should be the same type, except that integer and double types can be compared. The in operator is shorthand for, and exactly equivalent to, the following:

```
lhs==rhs1 or lhs==rhs2 or lhs==rhs3 . . .
```

NotInOperation
lhs notIn (rhs1, rhs2, rhs3 . . . )
   allowed types: all types
lhs and rhs should be the same type, except that integer and
   double types can be compared. The notIn operator is shorthand for, and exactly equivalent to, the following:

```
lhs!=rhs1 and lhs!=rhs2 and lhs!=rhs3 . . .
```

EqualsOperation
lhs equals rhs
lhs==rhs
   allowed types: all types
   lhs and rhs should be the same type, except that integer and double types can be compared.

NotEqualsOperation
lhs notEquals rhs
lhs!=rhs
   allowed types: all types
   lhs and rhs should be the same type, except that integer and double types can be compared.

LessThanOperation
lhs lessThan rhs
lhs<rhs
   allowed types: integer, double, money, datetime, duration
   lhs and rhs should be the same type, except that integer and double types can be compared.

GreaterThanOperation
lhs greaterThan rhs
lhs>rhs
   allowed types: integer, double, money, datetime, duration
   lhs and rhs should be the same type, except that integer and double types can be compared.

LessThanOrEqualsOperation
lhs lessThanOrEquals rhs
lhs>=rhs
   allowed types: integer, double, money, datetime, duration
   lhs and rhs should be the same type, except that integer and double types can be compared.

GreaterThanEqualsOperation
lhs greaterThanOrEquals rhs
lhs>=rhs
   allowed types: integer, double, money, datetime, duration
   lhs and rhs should be the same type, except that integer and double types can be compared.

AddOperation
lhs plus rhs
lhs+rhs
   allowed types: integer, double, money, datetime, duration
   Integer and double can be operated on, which will result in a double unless both operands are integers.
   Operations on money require that both lhs and rhs be the money type.
   A duration can be added to a duration, resulting in a duration.
   A datetime can be added to a duration or a duration can be added to a datetime, resulting in a datetime.

SubOperation
lhs minus rhs
lhs−rhs
   allowed types: integer, double, money, datetime, duration
   Integer and double can be operated on, which will result in a double unless both operands are integers.
   Operations on money require that both lhs and rhs be the money type.
   A duration can be subtracted from a duration, resulting in a duration.
   A duration can be subtracted from a datetime, a datetime must be the lhs and a duration must be the rhs, resulting in a datetime.

MultOperation
lhs times rhs
lhs*rhs
   allowed types: integer, double, money, duration
   Integer and double can be operated on, which will result in a double unless both operands are integers.
   For money, money can be multiplied by an integer or double, resulting in money.
   For duration, a duration can be multiplied by an integer, resulting in a duration.

DivOperation
lhs div rhs
lhs/rhs
   allowed types: integer, double, money
   Integer and double can be operated on, which will result in a double unless both operands are integers.
   For money, money can be divided by an integer or double, the lhs must be a money value and the rhs must be an integer or double, resulting in money.

MinFunction
min(lhs, rhs)
   allowed types: integer, double, money, datetime, duration
   lhs and rhs should be the same type, except that integer and double types can be compared.

MaxFunction
max(lhs, rhs)
   allowed types: integer, double, money, datetime, duration
   lhs and rhs should be the same type, except that integer and double types can be compared.

ModFunction
mod(lhs, rhs)
   allowed types: integer
   Results in the integer remainder of dividing lhs and rhs.

CatFunction
cat(lhs, rhs)
   allowed types: string
   Results in the combined string of lhs and rhs.

GetCurrencyCode
getCurrencyCode(rhs)
   allowed types: money
   Returns the currency code as a string.

Parse Grammar

```
Tokens:
    OR = "||";
    AND = "&&";
    NOT = "!";
    EQUALS = "==";
    NOT_EQUALS = "!=";
    L_THAN = "<";
    G_THAN = ">";
    LT_EQ = "<=";
    GT_EQ = ">=";
    PLUS = "+";
    MINUS = "-";
    ASTERIK = "*";
    DIV = "/";
    ASSIGN = ":=";
    ASSERTION;
///////////////////////////////////////////////////////////////
// Parser Rules
instructionSet
    : ( statement )+
    ;
statement
    : ( "duration"
        | "money"
        | "datetime"
        | "string"
        | "number"
      )?
      BB_REFERENCE ASSIGN
      expression STATEMENT_END
    | exp:expression STATEMENT_END
    ;
// expressions
expression
    : andExp ( ( OR | "or" ) andExp )*
    ;
andExp
    : compareExp ( ( AND | "and" ) compareExp )*
    ;
compareExp
    : addExp
      ( ( EQUALS | "equals"
          | NOT_EQUALS | "notEquals"
          | L_THAN | "lessThan"
          | G_THAN | "greaterThan"
          | LT_EQ | "lessThanOrEquals"
          | GT_EQ | "greaterThanOrEquals"
        ) addExp
        | ( "in " | "notIn" )
          LPAREN expression ( COMMA expression )* RPAREN
      )
    ;
addExp
    : multExp
      ( ( PLUS | "plus"
          | MINUS | "minus"
        ) multExp )*
    ;
multExp
    : unaryExp
      ( ( ASTERIK | "times"
          | DIV | "div"
        ) unaryExp )*
    ;
unaryExp
    : ( MINUS | "negate"
        | NOT | "not"
      ) scalarExp
    | scalarExp
    ;
scalarExp
    : literal
    | function
    | BB_REFERENCE
    | LPAREN expression RPAREN
    ;
// functions
function
    : minFunction
    | maxFunction
    | catFunction
    | getCurrencyCodeFunction
    ;
minFunction
    : "min" LPAREN expression ( COMMA expression )+ RPAREN
    ;
maxFunction
    : "max" LPAREN expression ( COMMA expression )+ RPAREN
    ;
catFunction
    : "cat" LPAREN expression ( COMMA expression )+ RPAREN
    ;
getCurrencyCodeFunction
    : "getCurrencyCode" LPAREN expression RPAREN
    ;
// literals
literal
    : booleanLiteral
    | numberLiteral
    | dateTimeLiteral
    | durationLiteral
    | stringLiteral
    | moneyLiteral
    ;
booleanLiteral
    : "true"
    | "false"
    ;
moneyLiteral
    : "money" LPAREN QUOTED_LITERAL COMMA
      expression RPAREN
    ;
numberLiteral
    : NUMBER_LITERAL ( PERCENT )?
    ;
dateTimeLiteral
    : "dateTime" LPAREN expression RPAREN
    | "now"
    ;
durationLiteral
    : "duration" LPAREN expression RPAREN
    ;
stringLiteral
    : QUOTED_LITERAL
    ;
```

Lexical Definitions

```
// character classifications
DOT                : '.';
LPAREN             : '(';
RPAREN             : ')';
COMMA              : ',';
STATEMENT_END      : ';';
PERCENT            : '%';
protected QUOTE_CHAR   : '\"';
protected DIGIT_CHAR   : ( '0' ... '9' );
protected ALPHA_CHAR   : ( 'a' ... 'z' | 'A' ... 'Z' );
protected NAME_CHAR    : ( ALPHA_CHAR | DIGIT_CHAR | '-' );
protected OPERATOR_CHAR
    : ( '|' | '&' | '!' | '<' | '>' | '=' | '+' | '-' | '*' | '/' | ':' )
    ;
// skip all whitespace
WHITESPACE
    : ( ' '
        | '\t'
        | '\n'
        | '\r'
      )+
    ;
```

-continued

```
// token classifications
BB_REFERENCE
    : ALPHA_CHAR ( NAME_CHAR )*
    ;
NUMBER_LITERAL
    : ( DIGIT_CHAR )+ ( '.' ( DIGIT_CHAR )+ )?
    ;
QUOTED_LITERAL
    : QUOTE_CHAR
        ( ~( '\n' | '\"' )
        | '\n'
        )*
        QUOTE_CHAR
    ;
OPERATOR
    : OPERATOR_CHAR ( OPERATOR_CHAR )?
    ;
COMMENT
    : '#' ~( '\n' | '\r' )
        ( '\n'
        | '\r' )+
    ;
```

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

The invention claimed is:

1. A computer-implemented method for performing programmatic Web service transactions between Web service provider and consumer parties that are automatically authorized in accordance with predefined instructions supplied by the Web service provider and consumer parties to a third-party transaction authorizer system, the method comprising, under control of computing systems of the Web service providers and consumers:

for each of multiple Web service providers, interacting with the third-party transaction authorizer system to define one or more payment instruction rule sets for the Web service provider and to receive in response for each of the payment instruction rule sets a reference token to which the payment instruction rule set is associated, each payment instruction rule set including multiple rules regulating whether to accept payments from Web service consumers for transactions that each have the Web service provider providing at least one Web service for a fee, each of the reference tokens generated by the transaction authorizer system for later use in referencing the associated payment instruction rule set for the reference token as part of a potential transaction;

for each of multiple Web service consumers, interacting with the third-party transaction authorizer system to define one or more payment instruction rule sets for the Web service consumer and to receive in response for each of the payment instruction rule sets a reference token to which the payment instruction rule set is associated, each payment instruction rule set including multiple rules regulating whether to provide payments to Web service providers for transactions that each have the Web service consumer receiving at least one Web service provided for a fee, each of the reference tokens generated by the transaction authorizer system for later use in referencing the associated payment instruction rule set for the reference token as part of a potential transaction; and using the generated reference tokens and associated payment instruction rule sets to enable payments for transactions involving Web services by, for each of multiple of the Web service consumers, identifying one or more Web services that are each provided for an associated fee by one of the Web service providers and programmatically invoking each of the identified Web services from the Web service provider who provides that Web service, the programmatic invoking of each of the Web services including supplying one of the reference tokens of the Web service consumer; and for each of multiple of the Web service providers, receiving one or more invocations that are each for a Web service provided by the Web service provider and that each include a reference token for a Web service consumer making the invocation and, for each of the received invocations of a Web service, sending a request to the transaction authorizer system to authorize a potential transaction that includes the Web service provider providing the invoked Web service to the Web service consumer making the invocation for the fee associated with the invoked Web service, the sent request including the reference token for the Web service consumer included with the received invocation and one of the reference tokens for the Web service provider; and when the transaction authorizer system determines that the potential transaction is authorized based on the payment instruction rule sets associated with the reference tokens included in the sent request being compatible, receiving the associated fee for the invoked Web service from the Web service consumer via the transaction authorizer system and providing the invoked Web service to the Web service consumer, so that Web service providers and consumers can conduct transactions that include payments for Web services in accordance with predefined instructions indicated by associated reference tokens.

2. The method of claim 1 including, under control of the transaction authorizer system, in response to each of multiple received requests that are each for authorization of a potential transaction between a Web service provider and a Web service consumer that includes a fee associated with a Web service to be provided, each authorization request including a reference token for the Web service provider and a reference token for the Web service consumer, determining whether to authorize the potential transaction by, retrieving the payment instruction rule sets associated with the reference tokens included in the authorization request;

determining whether the retrieved payment instruction rule sets are compatible such that the rules in the payment instruction rule set for the Web service provider allow acceptance of the associated fee from the Web service consumer in a manner specified in the payment instruction rule set for the Web service consumer and such that the rules in the payment instruction rule set for the Web service consumer allow payment of the associated fee to the Web service provider in a manner specified in the payment instruction rule set for the Web service provider; and when it is determined that the retrieved payment instruction rule sets are compatible, authorizing the potential transaction and providing the associated fee to the Web service provider in the manner specified in the payment instruction rule set for the Web service provider and obtaining payment from the Web service consumer in the manner specified in the payment instruction rule set for the Web service consumer.

3. The method of claim 1 wherein the providing by a Web service provider of an invoked Web service to a Web service consumer as part of a potential transaction includes providing a response message to the Web service consumer that includes information related to execution of the Web service by the Web service provider, and including, when the transaction authorizer system determines that then potential transaction is not authorized, providing from the Web service provider to the Web service consumer an error message related to the Web service.

4. The method of claim 1 wherein the Web service consumers are application developers that each provide to distinct end-users an application program that includes one or more of the reference tokens for the Web service consumer application developer, and wherein the programmatic invocations of the Web services are each from an application program being executed by an end-user and using one of the included reference tokens for the Web service consumer application developer that provided the application program.

5. The method of claim 4 wherein each of the programmatic invocations of a Web service from an application program being executed by an end-user further includes supplying a distinct reference token for the end-user that is associated with a payment instruction rule set of the end-user including rules regulating whether to provide payments for transactions that each include receiving at least one Web service, and wherein each of the sent requests to the transaction authorizer system by a Web service provider further includes a reference token for an end-user that is included with a received invocation for a Web service, such that the determining by the transaction authorizer system that a potential transaction is authorized is further based on compatibility of the payment instruction rule sets associated with the reference tokens for a Web service provider, a Web service consumer and an end-user.

6. The method of claim 1 wherein the determining that the payment instruction rule sets for a potential transaction are compatible includes:

for each rule in the payment instruction rule set associated with the reference token for the Web service provider, determining that the rule is satisfied by one or more of the Web service consumer, the payment instruction rule set associated with the reference token for the Web service consumer, information about the potential transaction, and an end-user executing an application program related to the potential transaction; and for each rule in the payment instruction rule set associated with the reference token for the Web service consumer, determining that the rule is satisfied by one or more of the Web service provider, the payment instruction rule set associated with the reference token for the Web service provider, the information about the potential transaction, and an end-user executing an application program related to the potential transaction.

7. The method of claim 6 wherein each of the payment instruction rule sets further includes one or more rules regulating types of transactions that the payment instruction rule set can authorize, one or more rules regulating post-transaction modification conditions that the payment instruction rule set can authorize, one or more rules regulating types of payment to be received or provided that the payment instruction rule set can authorize, and one or more rules regulating types of parties with whom the payment instruction rule set can authorize to conduct transactions.

8. The method of claim 1 wherein each of the Web service providers and Web service consumers has multiple payment instruction rule sets with distinct rules and distinct associated reference tokens, such that each potential transaction between a Web service provider and a Web service consumer includes a selection by each of the Web service provider and consumer of one of their payment instruction rule sets for use in determining whether to authorize the potential transaction.

9. The method of claim 1 wherein each of the Web service providers and Web service consumers has an account with the transaction authorizer system with which their payment instruction rule sets are associated, wherein the accounts of Web service consumers can be used as payment instruments for payments to Web service providers, wherein the accounts of Web service providers can be used as payment repositories for payments from Web service consumers, such that the providing of associated fees to Web service providers from Web service consumers for at least some of the potential transactions involves use of the accounts of the Web service providers and consumers involved in those transactions.

10. The method of claim 1 wherein the transaction authorizer system further charges a fee for each of one or more of providing generated reference tokens to Web service providers and consumers for later use, determining whether the payment instruction rule sets for a potential transaction are compatible, and providing of associated fees to a Web service provider from a Web service consumer for a potential transaction.

11. The method of claim 1 wherein the reference tokens are anonymous such that a party to a potential transaction cannot obtain information about the payment instruction rule set associated with the reference token of another party to the potential transaction and cannot obtain information about the another party from the reference token.

12. A method for a Web service provider to perform programmatic transactions that are automatically authorized based on predefined instructions of the Web service provider and other parties, the method performed under control of a computing system of the Web service provider, the method comprising:

receiving a request from a first party for a programmatic transaction between the first party and the Web service provider that includes an invocation of at least one Web service functionality of the Web service provider and an associated financial payment from the first party to the Web service provider for that Web service functionality;

obtaining a first reference token of the first party that is for use in determining whether to authorize the associated financial payment for the programmatic transaction, the first reference token being associated with a first predefined payment instruction rule set of the first party that is not accessible to the Web service provider;

sending an indication to a third-party transaction authorizer to automatically determine whether to authorize the associated financial payment from the first party to the Web service provider, the sent indication including the obtained first reference token of the first party and a second reference token of the Web service provider that is associated with a second predefined payment instruction rule set of the Web service provider that is not accessible to the first party, the transaction authorizer having access to the first and second payment instruction rule sets and the automatic determination by the transaction authorizer of whether to authorize the associated financial payment being based at least in part on whether the first and second payment instruction rule sets are determined to be compatible, and wherein the first and second payment instruction rule sets are determined to not be compatible for the programmatic transaction;

after the associated financial payment is determined to be authorized, providing the at least one Web service functionality to the first party; and after receiving an indication of a third reference token of the first party or the Web service provider for use in determining whether to authorize the associated financial payment for the programmatic transaction, determining to authorize the associated financial payment for the programmatic transaction based on a third payment instruction rule set that is associated with the third token being determined to be compatible with the first and/or second payment instruction rule sets.

13. The method of claim 12 including, when the associated financial payment is determined to be authorized, receiving the associated financial payment from the transaction authorizer on behalf of the first party.

14. The method of claim 12 including, after the associated financial payment is determined to be authorized, receiving the associated financial payment from the first party.

15. The method of claim 12 wherein the requested programmatic transaction further includes one or more additional associated financial payments that are each by one of the first party, the Web service provider and a third party related to the transaction and are each to a distinct one or more of the first party, the Web service provider, the third party and the transaction authorizer, such that the additional associated financial payments are each made when one or more corresponding payment instruction rule sets authorize that additional payment.

16. The method of claim 12 wherein the received request is from an application program provided by the first party to a distinct end-user who is executing the application program.

17. The method of claim 16 wherein the sent indication further includes an obtained third reference token of the end-user that is associated with a third predefined payment instruction rule set of the end-user, and wherein the determining of whether the retrieved first and second payment instruction rule sets are compatible so as to authorize the associated financial payment further includes determining whether the first and second payment instruction rules sets are compatible with the third payment instruction rule set.

18. The method of claim 12 wherein the received request is from an application program provided by another party to the first party who is executing the application program.

19. The method of claim 12 including, before the receiving of the request, interacting with the transaction authorizer to define the second payment instruction rule set and receiving the second reference token from the transaction authorizer in response.

20. The method of claim 19 including, before the receiving of the request by the Web service provider and under control of a computing system of the first party, interacting with the transaction authorizer to define the first payment instruction rule set and receiving the first reference token from the transaction authorizer in response.

21. The method of claim 12 wherein the tokens are anonymous such that the Web service provider cannot obtain information about the first payment instruction rule set from the first token and such that the first party cannot obtain information about the second payment instruction rule set from the second token.

22. The method of claim 12 wherein the first token is anonymous such that the Web service provider cannot obtain information about the first party from the first token.

23. The method of claim 12 wherein the sending of the indication to the third-party transaction authorizer is based on invocation of one or more Web services provided by the transaction authorizer.

24. The method of claim 12 wherein the sent indication is further to determine whether to authorize the programmatic transaction based at least in part on the first and second payment instruction rule sets.

25. The method of claim 12 wherein the sent indication is further to determine whether each of the first and second payment instruction rule sets is valid under current conditions.

26. The method of claim 12 wherein the determining of whether to authorized the associated financial payment further includes interactively providing information to the transaction authorizer by the first party and/or the Web service provider in accordance with information specified in the first and/or second payment instruction rule sets.

27. The method of claim 12 wherein the first and second payment instruction rule sets each include multiple rules that each specify criteria for determining whether the payment instruction rule set authorizes a programmatic transaction.

28. The method of claim 27 wherein the determining that the first and second payment instruction rule sets are compatible so as to authorize the associated financial payment includes determining that each of the rules of each of the first and second payment instruction rule sets is satisfied for the programmatic transaction.

29. The method of claim 27 wherein each of the payment instruction rule sets further includes one or more rules regulating types of transactions that the payment instruction rule set can authorize, one or more rules regulating post-transaction modification conditions that the payment instruction rule set can authorize, one or more rules regulating types of payment to be received or provided that the payment instruction rule set can authorize, and one or more rules regulating types of parties with whom the payment instruction rule set can authorize to conduct transactions.

30. The method of claim 12 wherein the first party and the Web service provider each further has one or more usage instruction rule sets that each includes multiple rules regulating whether to provide to and/or receive from another party access to information as part of a potential programmatic transaction.

31. The method of claim 12 wherein the first party and the Web service provider each has an account with the transaction authorizer with which their payment instruction rule sets are associated, and including providing the associated financial payment to the Web service provider on behalf of the first party by using the account of the first party as a payment instrument for the financial payment and using the account of the Web service provider as a payment repository for the financial payment.

32. The method of claim 12 further comprising, after receiving a request from a distinct second party for a second programmatic transaction between the second party and the Web service provider that includes an invocation of a Web service functionality of the Web service provider and a second associated financial payment from the second party to the Web service provider, providing that Web service functionality to the second party after the second financial payment for the second programmatic transaction is determined to be authorized based on the second payment instruction rule set being determined to be compatible with a third payment instruction rule set that is associated with a distinct third token for the second party.

33. The method of claim 12 further comprising, after receiving a second request from the first party for a second programmatic transaction between the first party and the Web service provider, and after sending a second indication to the transaction authorizer that includes the first and second reference tokens, receiving an indication from the transaction authorizer of a determination to not authorize the second programmatic transaction based on the first and second payment instruction rule sets being determined to not be compatible for the second programmatic transaction.

34. The method of claim 12 wherein each of the first and second payment instruction rule sets are XML documents.

35. The method of claim 12 wherein the obtaining of the first reference token includes receiving the first reference token with the received request.

36. The method of claim 12 further comprising, after the associated financial payment is determined to be authorized and before the providing of the at least one Web service functionality to the first party, obtaining the associated financial payment.

37. The method of claim 12 further comprising, after the providing of the at least one Web service functionality to the first party, obtaining the associated financial payment.

38. The method of claim 12 wherein the providing of the at least one Web service functionality to the first party is performed substantially concurrent with obtaining of the associated financial payment from the first party.

39. The method of claim 12 wherein the first party has multiple distinct payment instruction rule sets that have multiple distinct associated reference tokens, the first reference token being one of the multiple associated reference tokens.

40. The method of claim 39 wherein the obtaining of the first reference token of the first party for use in determining whether to authorize the associated financial payment for the programmatic transaction is based on selection by the first party of the first reference token from the multiple associated reference tokens so as to reflect a selection by the first party to use the distinct payment instruction rule set associated with the first reference token for authorizing the associated financial payment for the programmatic transaction.

41. A computer-readable medium whose contents cause a computing system to perform automatically authorized transactions between parties, by performing a method comprising:
receiving an indication of a potential transaction between distinct first and second parties that includes an associated financial payment from the first party to the second party for providing one or more services associated with the potential transaction;
receiving indications of a first reference for the first party and a second reference for the second party for use in determining whether to authorize the potential transaction, wherein the first party has multiple distinct references that each are associated with a distinct usage instruction rule set of the first party, the first reference being one of the multiple distinct references;
obtaining an indication from a transaction authorization system distinct from the first and second parties whether a first usage instruction rule set associated with the first reference is automatically determined to be compatible with a second usage instruction rule set associated with the second reference in such a manner as to authorize the potential transaction;
after the first and second usage instruction rule sets are determined to be compatible, facilitating performance of the potential transaction;
receiving an indication of a second transaction between at least the first party and another party and of an indication of a third reference of the first party that the first party has selected for use in determining whether to authorize the second transaction, the third reference being one of the multiple distinct references and being distinct from the first reference; and
automatically determining whether the usage instruction rule set of the first party that is associated with the third reference is compatible with a usage instruction rule set for the another party, the usage instruction rule set of the first party associated with the third reference being set of the first party associated with the first reference, so that the first party may select distinct usage instruction rule sets for use with distinct transactions by indicating the reference associated with a selected usage instruction rule set.

42. The computer-readable medium of claim 41 wherein the method is performed by the first party, and wherein the facilitating of the performance of the potential transaction includes providing of the associated financial payment to the second party from the first party and receiving information and/or functionality from the second party as part of providing of the one or more services.

43. The computer-readable medium of claim 41 wherein the method is performed by the second party, and wherein the facilitating of the performance of the potential transaction includes receiving the associated financial payment from the first party and providing information and/or functionality to the first party and/or a third party as part of performing the one or more services.

44. The computer-readable medium of claim 41 wherein the method is performed by a third party, and wherein the facilitating of the performance of the potential transaction includes receiving information and/or functionality from the second party as part of providing of the one or more services.

45. The computer-readable medium of claim 41 wherein the potential transaction includes invoking by one of the first and second parties of a Web service provided by the other of the first and second parties.

46. The computer-readable medium of claim 41 wherein determining that the first and second usage instruction rules sets are compatible includes evaluating each of multiple rules in each of the first and second usage instruction rules sets to determine that the rule is satisfied for the potential transaction.

47. The computer-readable medium of claim 41 wherein the potential transaction further includes at least one additional party, and wherein the determining of whether the first and second usage instruction rule sets are compatible further includes determining whether the first and second usage instruction rule sets are compatible with an additional usage instruction rule set for each of the at least one additional parties.

48. The computer-readable medium of claim 41 wherein at least one of the first and second references is a reference token that is dynamically generated for use with the potential transaction and whose associated usage instruction rule set is based at least in part on instructions specified for the potential transaction.

49. The computer-readable medium of claim 48 wherein each dynamically generated reference token is a single-use token available for use only with the potential transaction.

50. The computer-readable medium of claim 41 wherein the computer-readable medium is a memory of a computing system.

51. The computer-readable medium of claim 41 wherein the computer-readable medium is a data transmission medium transmitting a generated data signal containing the contents.

52. The computer-readable medium of claim 41 wherein the contents are instructions that when executed cause the computing system to perform the method.

53. The computer-readable medium of claim 41 wherein the contents include one or more data structures for use in automatically authorizing transactions between parties, the data structure comprising a multiplicity of entries, each entry being a usage instruction rule set associated with a party and containing an indication of a unique associated reference token and of indications of multiple rules for the usage instruction rule set.

54. The computer-readable medium of claim 41 wherein the facilitating of the performance of the potential transaction is performed before the associated financial payment is made from the first party to the second party.

55. The computer-readable medium of claim 41 wherein the facilitating of the performance of the potential transaction is performed after the associated financial payment is made from the first party to the second party.

56. The computer-readable medium of claim 41 wherein the facilitating of the performance of the potential transaction is performed substantially concurrent with obtaining of the associated financial payment from the first party by the second party.

57. The computer-readable medium of claim 41 wherein the first party has multiple distinct references that each are associated with a distinct usage instruction rule set of the first party, the first reference being one of the multiple distinct references.

58. The computer-readable medium of claim 57 wherein the received indication of the first reference for the first party for use in determining whether to authorize the potential transaction is based on selection by the first party of the first reference from the multiple distinct references so as to reflect a selection by the first party to use the distinct usage instruction rule set associated with the first reference for authorizing the potential transaction.

59. A method for a Web service provider to perform programmatic transactions that are automatically authorized based on predefined instructions of the Web service provider and other parties, the method performed under control of a computing system of the Web service provider, the method comprising:

receiving a request from a first party for a programmatic transaction between the first party and the Web service provider that includes an invocation of at least one Web service functionality of the Web service provider and an associated financial payment from the first party to the Web service provider for that Web service functionality;

obtaining a first reference token of the first party that is for use in determining whether to authorize the associated financial payment for the programmatic transaction, the first reference token being associated with a first predefined payment instruction rule set of the first party that is accessible to the Web service provider, the first party having multiple distinct payment instruction rule sets that have multiple distinct associated reference tokens, the first reference token being one of the multiple associated reference tokens;

sending an indication to a third-party transaction authorizer to automatically determine whether to authorize the associated financial payment from the first party to the Web service provider, the sent indication including the obtained first reference token of the first party and a second reference token of the Web service provider that is associated with a second predefined payment instruction rule set of the Web service accessible to the first party, the transaction authorizer having access to the first and second payment instruction rule sets and the automatic determination by the transaction authorizer of whether to authorize the associated financial payment being based at least in part on whether the first and second payment instruction rule sets are determined to be compatible;

after the associated financial payment is determined to be authorized, providing the at least one Web service functionality to the first party;

receiving a request for a second transaction between at least the first party and the Web service provider and of an indication of a third reference token of the first party that the first party has selected for use in determining whether to authorize a second associated financial payment for the second transaction from the first party to the Web service provider, the third reference token being one of the multiple associated reference tokens and being distinct from the first reference token; and automatically determining whether to authorize the second associated financial payment from the first party to the Web service provider based in part on the payment instruction rule set of the first party that is associated with the third reference token, the payment instruction rule set of the first party associated with the third reference token being distinct from the payment instruction rule set of the first party associated with the first reference token, so that the first party may select distinct payment instruction rule sets for use with distinct transactions by indicating the reference token associated with a selected payment instruction rule set.

60. A computer-implemented method for facilitating performance of automatically authorized transactions between parties, the method comprising:

automatically determining whether to authorize a first potential transaction between distinct first and second parties based at least in part on a first instruction rule set for the first party and on a distinct second instruction rule set for the second party, the first instruction rule set being indicated with an associated first reference token and containing information regarding conditions under which potential transactions may be authorized for the first party, the second instruction rule set being indicated with an associated second reference token and containing information regarding conditions under which potential transactions may be authorized for the second party, the first party having multiple distinct instruction rule sets that each have a distinct associated reference token such that the first instruction rule set is selected by the first party from the multiple instruction rule sets for use in determining whether to authorize the first potential transaction;

if the first potential transaction is determined to be authorized based at least in part on the first and second instruction rule sets, facilitating performance of the first potential transaction;

automatically determining whether to authorize a second potential transaction between the first and second parties based at least in part on a third instruction rule set for the first party and on a fourth instruction rule set for the second party, the third instruction rule set being distinct from the first instruction rule set and being selected by the first party from the multiple instruction rule sets of the first party for use in determining whether to authorize the second potential transaction; and if the second potential transaction is determined to be authorized based at least in part on the third and fourth instruction rule sets, facilitating performance of the second potential transaction.

61. The method of claim 60 wherein a first payment is associated with the first potential transaction, and wherein the automatic determining of whether to authorize the first potential transaction includes determining whether the first and second instruction rule sets authorizes one of the first and second parties to make the first payment to the other of the first and second parties as part of the first potential transaction.

62. The method of claim 60 wherein the automatic determining of whether to authorize the first potential transaction includes sending the first and second reference tokens to a third-party transaction authorization system and receiving information from the third-party transaction authorization system indicating whether the first potential transaction is authorized based on the first and second instruction rule sets.

63. The method of claim 60 wherein the second party has multiple distinct instruction rule sets that have multiple distinct associated reference tokens such that the second instruction rule set is selected by the second party for use in determining whether to authorize the first potential transaction.

64. The method of claim 63 wherein the fourth instruction rule set is distinct from the second instruction rule set.

65. The method of claim 60 further comprising, before the automatic determining of whether to authorize the first potential transaction, receiving an indication from the first party of the first reference token for the first potential transaction so that the first instruction rule set is identified to be used for the automatic determining of whether to authorize the first potential transaction.

* * * * *

UNITED STATES PATENT AND TRADEMARK OFFICE
CERTIFICATE OF CORRECTION

PATENT NO. : 7,383,231 B2
APPLICATION NO. : 10/894350
DATED : June 3, 2008
INVENTOR(S) : Vikas Gupta et al.

It is certified that error appears in the above-identified patent and that said Letters Patent is hereby corrected as shown below:

COLUMN (50)
lines 27-28 "reference being set of the first party" should read as --reference being distinct from the usage instruction rule set of the first party--

COLUMN (52)
line 21 "the Web service accessible" should read as --the Web service provider that is not accessible--

Signed and Sealed this

Seventh Day of April, 2009

JOHN DOLL
*Acting Director of the United States Patent and Trademark Office*